United States Patent
Nagasawa et al.

(10) Patent No.: US 11,886,081 B2
(45) Date of Patent: Jan. 30, 2024

(54) LIQUID CRYSTAL DEVICE COMPRISING A PLURALITY OF FIRST SPACERS DISPOSED INSIDE A SEALANT AND A PLURALITY OF FIRST AND SECOND STRIP ELECTRODES

(71) Applicant: Japan Display Inc., Tokyo (JP)

(72) Inventors: Junko Nagasawa, Tokyo (JP); Hiroya Morimoto, Tokyo (JP); Yuji Maede, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/182,378

(22) Filed: Mar. 13, 2023

(65) Prior Publication Data
US 2023/0213821 A1    Jul. 6, 2023

Related U.S. Application Data

(63) Continuation of application No. 17/546,088, filed on Dec. 9, 2021, now Pat. No. 11,650,463.

(30) Foreign Application Priority Data

Dec. 10, 2020    (JP) ................................. 2020-204916

(51) Int. Cl.
*G02F 1/1339* (2006.01)
*G02F 1/1343* (2006.01)
(Continued)

(52) U.S. Cl.
CPC ........ *G02F 1/13394* (2013.01); *G02F 1/1337* (2013.01); *G02F 1/1347* (2013.01);
(Continued)

(58) Field of Classification Search
CPC ....................... G02F 1/134327; G02F 1/13396
See application file for complete search history.

(56) References Cited

U.S. PATENT DOCUMENTS

| 2003/0066985 A1* | 4/2003 | Hisamitsu .......... C09K 19/3068 |
| | | 252/299.61 |
| 2016/0042702 A1* | 2/2016 | Hirakata ................ H10K 59/38 |
| | | 345/87 |

(Continued)

FOREIGN PATENT DOCUMENTS

| CN | 1955791 A | 5/2007 |
| CN | 101424827 A | 5/2009 |

(Continued)

OTHER PUBLICATIONS

Office Action dated Jul. 22, 2023, in corresponding Chinese patent Application No. 202111503271.5, 10 pages.

*Primary Examiner* — Paul C Lee
(74) *Attorney, Agent, or Firm* — XSENSUS LLP

(57) ABSTRACT

According to one embodiment, a liquid crystal device includes a first liquid crystal cell and a second liquid crystal cell bonded to the first liquid crystal cell. Each of the first liquid crystal cell and the second liquid crystal cell includes a first substrate, a second substrate, a liquid crystal layer, a sealant bonding the first substrate and the second substrate together, one or more first spacers disposed inside the sealant and holding the gap, and a plurality of second spacers disposed in an effective area surrounded by the sealant and holding the gap.

12 Claims, 19 Drawing Sheets

(51) Int. Cl.
  *G02F 1/1347* (2006.01)
  *G02F 1/1337* (2006.01)
(52) U.S. Cl.
  CPC .... *G02F 1/13439* (2013.01); *G02F 1/134327* (2013.01); *G02F 1/134336* (2013.01)

(56) References Cited

U.S. PATENT DOCUMENTS

| | | | |
|---|---|---|---|
| 2016/0070127 A1* | 3/2016 | Ishikawa | G02F 1/1368 349/42 |
| 2019/0094595 A1* | 3/2019 | Xing | G02F 1/13394 |
| 2019/0271869 A1* | 9/2019 | Cao | G02F 1/13394 |

FOREIGN PATENT DOCUMENTS

| | | | |
|---|---|---|---|
| CN | 102854666 A | | 1/2013 |
| CN | 103439836 A | | 12/2013 |
| CN | 206363059 U | | 7/2017 |
| JP | 2002107735 A | * | 4/2002 |

\* cited by examiner

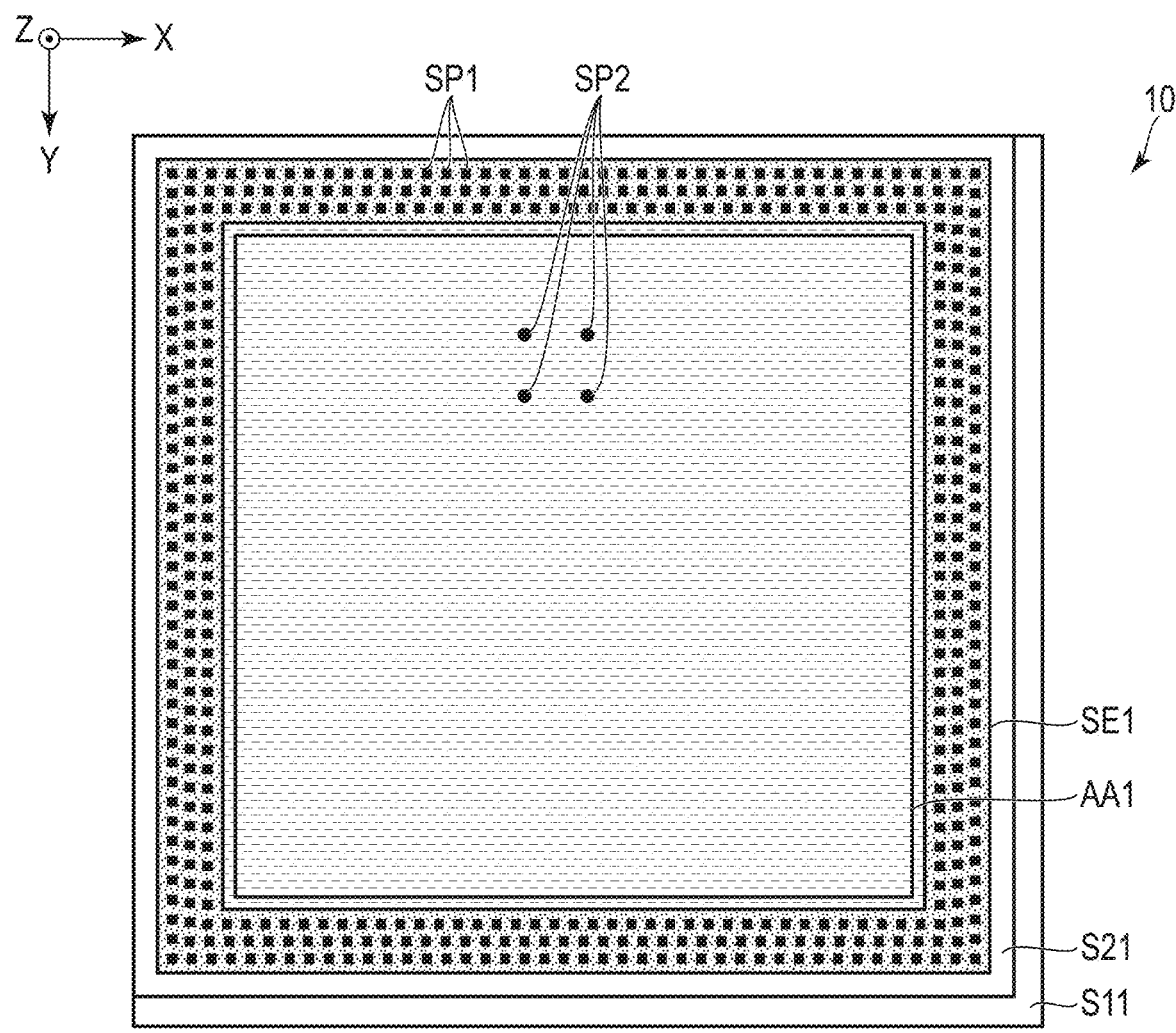
F I G. 10

LIQUID CRYSTAL DEVICE COMPRISING A PLURALITY OF FIRST SPACERS DISPOSED INSIDE A SEALANT AND A PLURALITY OF FIRST AND SECOND STRIP ELECTRODES

CROSS-REFERENCE TO RELATED APPLICATIONS

This application is a continuation of U.S. application Ser. No. 17/546,088, filed Dec. 9, 2021, which is based upon and claims the benefit of priority from Japanese Patent Application No. 2020-204916, filed Dec. 10, 2020, the entire contents of each are incorporated herein by reference.

FIELD

Embodiments described herein relate generally to a liquid crystal device.

BACKGROUND

In recent years, a light control device using a liquid crystal cell has been proposed. Such a light control device primarily converges or diverges one polarization component. For example, a liquid crystal lens including a plurality of ring-shaped strip electrodes has been proposed. In addition, as another example, a liquid crystal lens including a transparent electrode disposed in a plurality of fan-shaped divided regions has also been proposed.

BRIEF DESCRIPTION OF THE DRAWINGS

FIG. 10 is a plane view illustrating another example of the first liquid crystal cell 10.

DETAILED DESCRIPTION

Figure 1:
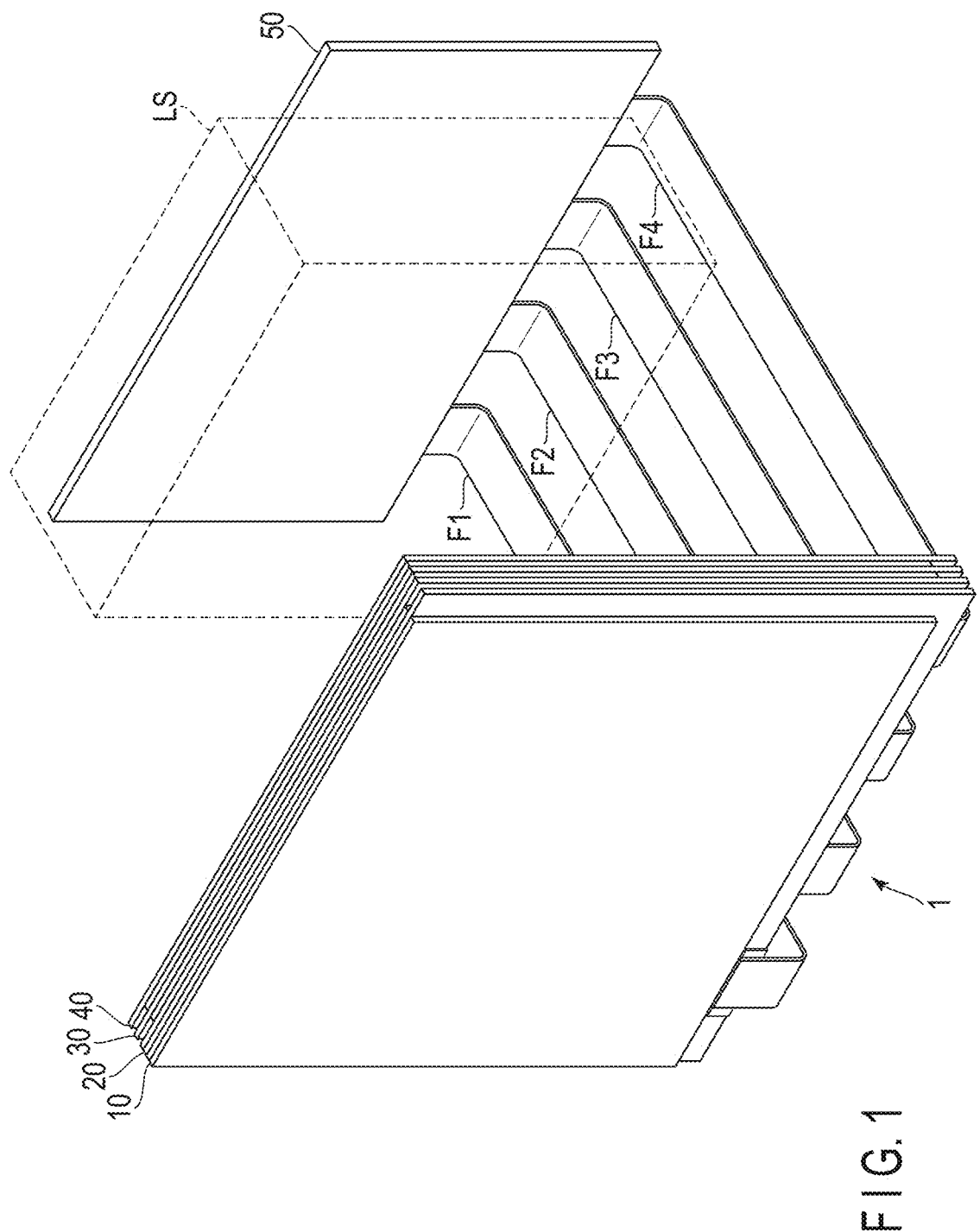
FIG. 1 is a perspective view illustrating a liquid crystal device 1 according to the present embodiment.

In general, according to one embodiment, there is provided a liquid crystal device includes a first liquid crystal cell; and a second liquid crystal cell bonded to the first liquid crystal cell, wherein each of the first liquid crystal cell and the second liquid crystal cell comprises: a first substrate comprising a plurality of first electrodes formed in a strip shape; a second substrate comprising a plurality of second electrodes formed in a strip shape; a liquid crystal layer held in a gap of 10 μm or more between the first substrate and the second substrate; a sealant bonding the first substrate and the second substrate together; one or more first spacers disposed inside the sealant and holding the gap; and a plurality of second spacers disposed in an effective area surrounded by the sealant and holding the gap.

According to an embodiment, it is possible to provide a liquid crystal device capable of suppressing degradation in reliability.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the drawings, in order to make understanding easier, an X-axis, a Y-axis and a Z-axis which are orthogonal to each other are shown as needed. A direction along the X-axis is referred to as an X direction or the first direction, a direction along the Y-axis is referred to as a Y direction or the second direction, and a direction along the Z-axis is referred to as a Z direction or the third direction. A plane defined by the X-axis and the Y-axis is referred to as an X-Y plane, and viewing the X-Y plane is referred to as planar view.

FIG. 1 is a perspective view illustrating a liquid crystal device 1 according to the present embodiment.

The liquid crystal device 1 includes a first liquid crystal cell 10, a second liquid crystal cell 20, a third liquid crystal cell 30, a fourth liquid crystal cell 40, a first flexible printed circuit F1, a second flexible printed circuit F2, a third flexible printed circuit F3, a fourth flexible printed circuit F4, and a circuit board 50. The liquid crystal device 1 according to the present embodiment includes two or more liquid crystal cells, and is not limited to the configuration including four liquid crystal cells as in the example illustrated in FIG. 1.

The first liquid crystal cell 10, the second liquid crystal cell 20, the third liquid crystal cell 30, and the fourth liquid crystal cell 40 are stacked in this order.

The first flexible printed circuit F1 electrically connects the first liquid crystal cell 10 to the circuit board 50. The second flexible printed circuit F2 electrically connects the second liquid crystal cell 20 to the circuit board 50. The third flexible printed circuit F3 electrically connects the third liquid crystal cell 30 to the circuit board 50. The fourth flexible printed circuit F4 electrically connects the fourth liquid crystal cell 40 to the circuit board 50.

The first flexible printed circuit F1, the second flexible printed circuit F2, the third flexible printed circuit F3, and the fourth flexible printed circuit F4 are bent along edges of the first liquid crystal cell 10, the second liquid crystal cell 20, the third liquid crystal cell 30, and the fourth liquid crystal cell 40, respectively, and are further bent along an edge of the circuit board 50. The circuit board 50 is disposed spaced apart so as to be opposed to the fourth liquid crystal cell 40.

A region for disposing a light source module LS indicated by a dotted line is secured between the circuit board 50 and the fourth liquid crystal cell 40. The light source module LS includes at least a light source, and includes an optical element such as a lens between the light source and the fourth liquid crystal cell 40 as needed.

Light emitted from the light source module LS is, for example, unpolarized light. The emitted light from the light source module LS is sequentially transmitted through the fourth liquid crystal cell 40, the third liquid crystal cell 30, the second liquid crystal cell 20, and the first liquid crystal cell 10. As will be described later, the fourth liquid crystal cell 40, the third liquid crystal cell 30, the second liquid crystal cell 20, and the first liquid crystal cell 10 are configured to diverge a polarization component of a part of incident light. By combining the liquid crystal device 1 and the light source module LS in this manner, it is possible to provide an illumination device in which the degree of divergence of light is variable.

Figure 2:
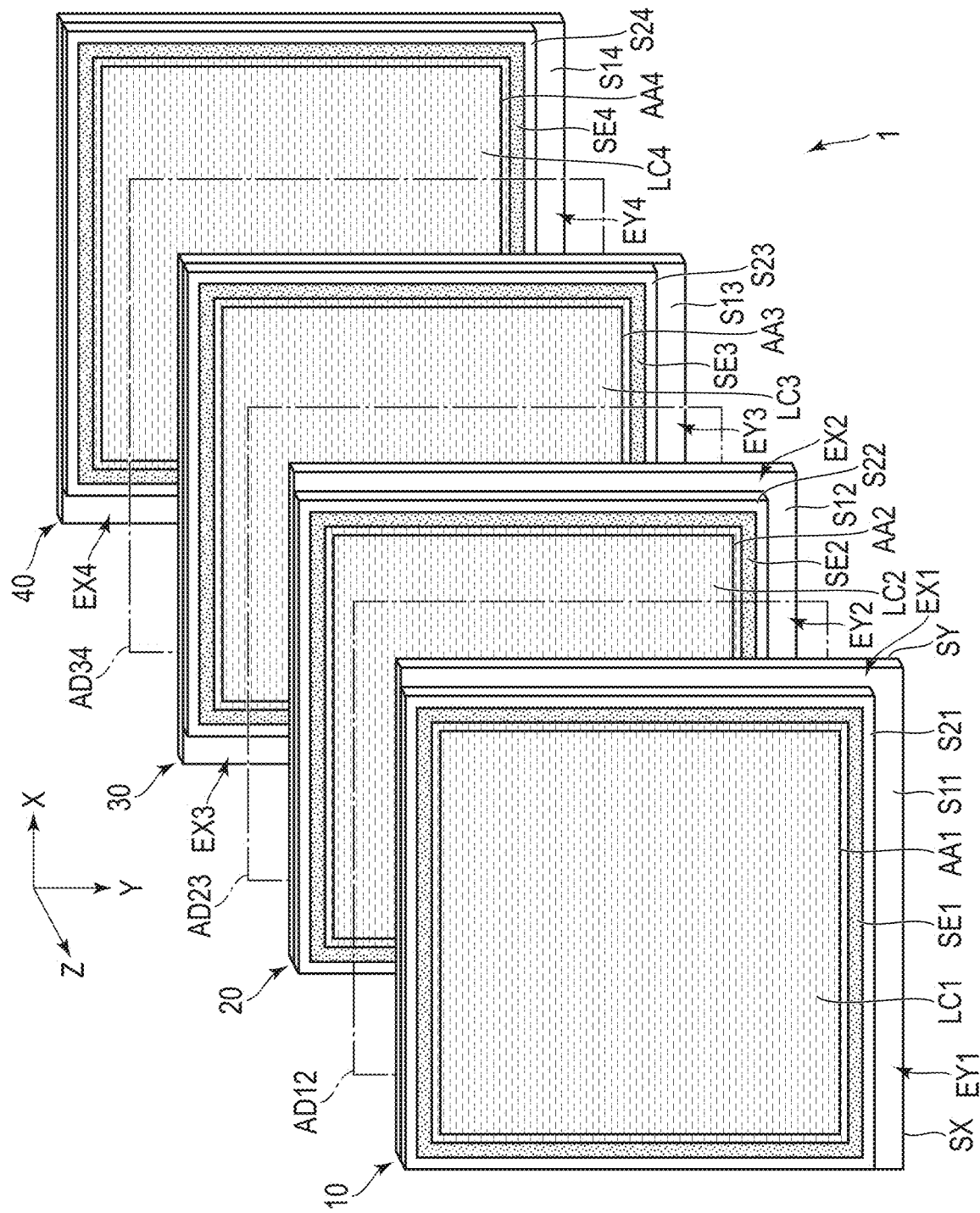
FIG. 2 is an exploded perspective view illustrating the liquid crystal device 1 illustrated in FIG. 1.

FIG. 2 is an exploded perspective view illustrating the liquid crystal device 1 illustrated in FIG. 1. In FIG. 2, the first flexible printed circuit F1, the second flexible printed circuit F2, the third flexible printed circuit F3, the fourth flexible printed circuit F4, and the circuit board 50 are not illustrated.

The first liquid crystal cell 10 includes a first substrate S11, a second substrate S21, a liquid crystal layer LC1, and a sealant SE1. The first substrate S11 and the second substrate S21 are bonded together by the sealant SE1. The liquid crystal layer LC1 is held between the first substrate S11 and the second substrate S21, and is sealed by the sealant SE1. An effective area AA1 capable of diverging the incident light is formed in the inside surrounded by the sealant SE1.

For example, a first direction X is a direction parallel to one edge SX of the first substrate S11, and a second direction Y is a side parallel to the other edge SY of the first substrate S11. A third direction Z is a thickness direction of the first substrate S11. Such a correspondence relationship between each direction and the first substrate S11 can also be applied to the second substrate S21, and can also be similarly applied to the other liquid crystal cells 20 to 40.

The first substrate S11 includes an extended portion EX1 extending outward from the second substrate S21 along the first direction X and an extended portion EY1 extending outward from the second substrate S21 along the second direction Y.

The second liquid crystal cell 20 includes a first substrate S12, a second substrate S22, a liquid crystal layer LC2, and a sealant SE2. The first substrate S12 and the second substrate S22 are bonded together by the sealant SE2. The liquid crystal layer LC2 is held between the first substrate S12 and the second substrate S22, and is sealed by the sealant SE2. An effective area AA2 is formed in the inside surrounded by the sealant SE2.

The first substrate S12 includes an extended portion EX2 extending outward from the second substrate S22 along the first direction X and an extended portion EY2 extending outward from the second substrate S22 along the second direction Y. In the third direction Z, the extended portion EX2 overlaps with the extended portion EX1, and the extended portion EY2 overlaps with the extended portion EY1.

The third liquid crystal cell 30 includes a first substrate S13, a second substrate S23, a liquid crystal layer LC3, and a sealant SE3. The first substrate S13 and the second substrate S23 are bonded together by the sealant SE3. The liquid crystal layer LC3 is held between the first substrate S13 and the second substrate S23, and is sealed by the sealant SE3. An effective area AA3 is formed in the inside surrounded by the sealant SE3.

The first substrate S13 includes an extended portion EX3 extending outward from the second substrate S23 along the first direction X and an extended portion EY3 extending outward from the second substrate S23 along the second direction Y. In the third direction Z, the extended portion EY3 overlaps with the extended portion EY2. The extended portion EX3 does not overlap with the extended portion EX2 and is located on the opposite side of the extended portion EX2.

The fourth liquid crystal cell 40 includes a first substrate S14, a second substrate S24, a liquid crystal layer LC4, and a sealant SE4. The first substrate S14 and the second substrate S24 are bonded together by the sealant SE4. The liquid crystal layer LC4 is held between the first substrate S14 and the second substrate S24, and is sealed by the sealant SE4. An effective area AA4 is formed in the inside surrounded by the sealant SE4.

The first substrate S14 includes an extended portion EX4 extending outward from the second substrate S24 along the first direction X and an extended portion EY4 extending outward from the second substrate S24 along the second direction Y. In the third direction Z, the extended portion EX4 overlaps with the extended portion EX3, and the extended portion EY4 overlaps with the extended portion EY3.

A transparent adhesive layer AD12 is disposed between the first liquid crystal cell 10 and the second liquid crystal cell 20. The transparent adhesive layer AD12 bonds the first substrate S11 to the second substrate S22.

A transparent adhesive layer AD23 is disposed between the second liquid crystal cell 20 and the third liquid crystal cell 30. The transparent adhesive layer AD23 bonds the first substrate S12 to the second substrate S23.

A transparent adhesive layer AD34 is disposed between the third liquid crystal cell 30 and the fourth liquid crystal cell 40. The transparent adhesive layer AD34 bonds the first substrate S13 to the second substrate S24.

Next, the first liquid crystal cell 10, the second liquid crystal cell 20, the third liquid crystal cell 30, and the fourth liquid crystal cell 40 will be described below.

Figure 3:
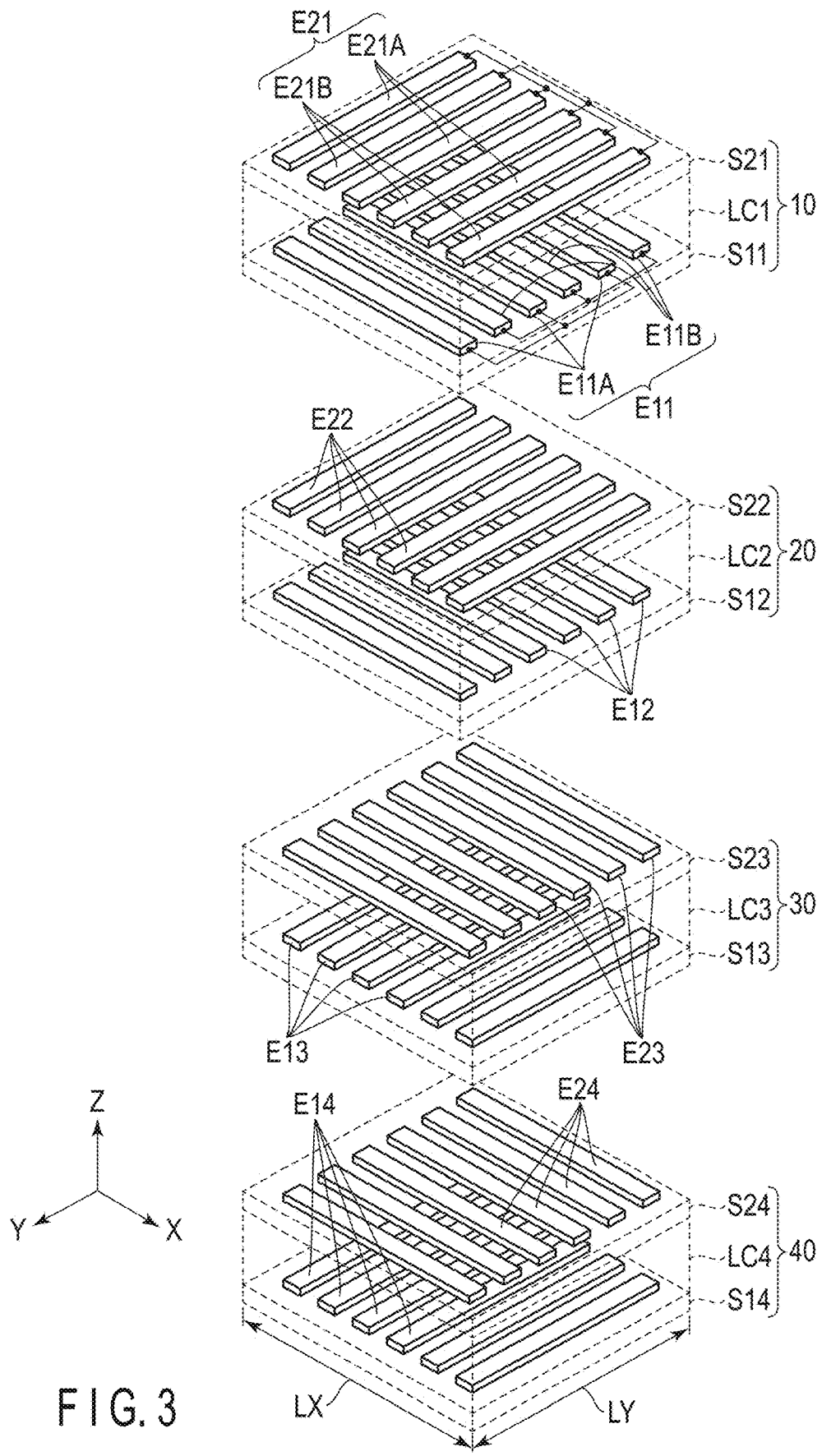
FIG. 3 is a perspective view illustrating a first liquid crystal cell 10, a second liquid crystal cell 20, a third liquid crystal cell 30, and a fourth liquid crystal cell 40 by way of example.

FIG. 3 is a perspective view illustrating the first liquid crystal cell 10, the second liquid crystal cell 20, the third liquid crystal cell 30, and the fourth liquid crystal cell 40 by way of example.

In the first liquid crystal cell 10, the first substrate S11 includes a plurality of first electrodes E11 formed in a strip shape. A plurality of the first electrodes E11 are extended along the first direction X and are arranged spaced apart along the second direction Y. The second substrate S21 includes a plurality of second electrodes E21 formed in a strip shape. A plurality of the second electrodes E21 are extended along the second direction Y and are arranged spaced apart along the first direction X. In other words, a plurality of the first electrodes E11 and a plurality of the second electrodes E21 intersect with each other. As will be described later, the first electrodes E11 and the second electrodes E21 intersect at an angle of about 90° in planar view.

In the second liquid crystal cell 20, similarly to the first liquid crystal cell 10, a plurality of the first electrodes E12 of the first substrate S12 are extended along the first direction X, and are arranged spaced apart along the second direction Y. A plurality of the second electrodes E22 of the second substrate S22 are extended along the second direction Y and are arranged spaced apart along the first direction X.

In the third liquid crystal cell 30, a plurality of the first electrodes E13 of the first substrate S13 are extended along the second direction Y, and are arranged spaced apart along the first direction X. A plurality of the second electrodes E23 of the second substrate S23 are extended along the first direction X and are arranged spaced apart along the second direction Y.

In the fourth liquid crystal cell 40, similarly to the third liquid crystal cell, a plurality of the first electrodes E14 of the first substrate S14 are extended along the second direction Y, and are arranged spaced apart along the first direction X. A plurality of the second electrodes E24 of the second substrate S24 are extended along the first direction X and are arranged spaced apart along the second direction Y.

For example, the first liquid crystal cell 10 and the fourth liquid crystal cell 40 have a relationship of 90° rotational symmetry in the X-Y plane. The first electrodes E11 and the first electrodes E14 are orthogonal to each other, and the second electrodes E21 and the second electrodes E24 are orthogonal to each other. In other words, the fourth liquid crystal cell 40 has the same configuration as the first liquid crystal cell 10, and when the first liquid crystal cell 10 is rotated by 90° in the X-Y plane, the arrangement of the first electrodes E11 is coincident with the arrangement of the first electrodes E14 and the arrangement of the second electrodes E21 is coincident with the arrangement of the second electrodes E24.

Similarly, the second liquid crystal cell 20 and the third liquid crystal cell 30 have a relationship of 90° rotational symmetry in the X-Y plane. The first electrodes E12 and the first electrodes E13 are orthogonal to each other, and the second electrodes E22 and the second electrodes E23 are orthogonal to each other.

The first electrodes E11 of the first liquid crystal cell 10 and the first electrodes E12 of the second liquid crystal cell 20 intersect each other at an angle less than 90° in the X-Y plane. The first electrodes E13 of the third liquid crystal cell 30 and the first electrodes E14 of the fourth liquid crystal cell 40 intersect each other at an angle less than 90° in the X-Y plane.

The first substrates S11 to S14 each are formed in a square shape and have the same size. In other words, the first substrates S11 to S14 have the same length LX along the first direction X and the same length LY along the second direction Y. The length LX is equal to the length LY (LX=LY).

For this reason, when the first liquid crystal cell 10, the second liquid crystal cell 20, the third liquid crystal cell 30, and the fourth liquid crystal cell 40 are bonded to each other, edges thereof along the first direction X overlap each other, and edges thereof along the second direction Y also overlap each other, as shown in FIG. 1.

The first liquid crystal cell 10, the second liquid crystal cell 20, the third liquid crystal cell 30, and the fourth liquid crystal cell 40 have substantially the same configuration. Hereinafter, the first liquid crystal cell 10 will be described more specifically as a representative.

A plurality of the first electrodes E11 include a plurality of first strip electrodes E11A and a plurality of second strip electrodes E11B. A plurality of the first strip electrodes E11A are configured to be electrically connected to each other and to have the same voltage applied thereto. A plurality of the second strip electrodes E11B are configured to be electrically connected to each other and to have the same voltage applied thereto. However, the voltage applied to the second strip electrodes E11B is controlled to be different from the voltage applied to the first strip electrodes E11A. These first strip electrodes E11A and second strip electrodes E11B are alternately arranged along the second direction Y.

A plurality of the second electrodes E21 include a plurality of third strip electrodes E21A and a plurality of fourth strip electrodes E21B. A plurality of the third strip electrodes E21A are configured to be electrically connected to each other and to have the same voltage applied thereto. The plurality of fourth strip electrodes E21B are configured to be electrically connected to each other and to have the same voltage applied thereto. However, the voltage applied to the fourth strip electrodes E21B is controlled to be different from the voltage applied to the third strip electrodes E21A. These third strip electrodes E21A and fourth strip electrodes E21B are alternately arranged along the first direction X.

Figure 4:
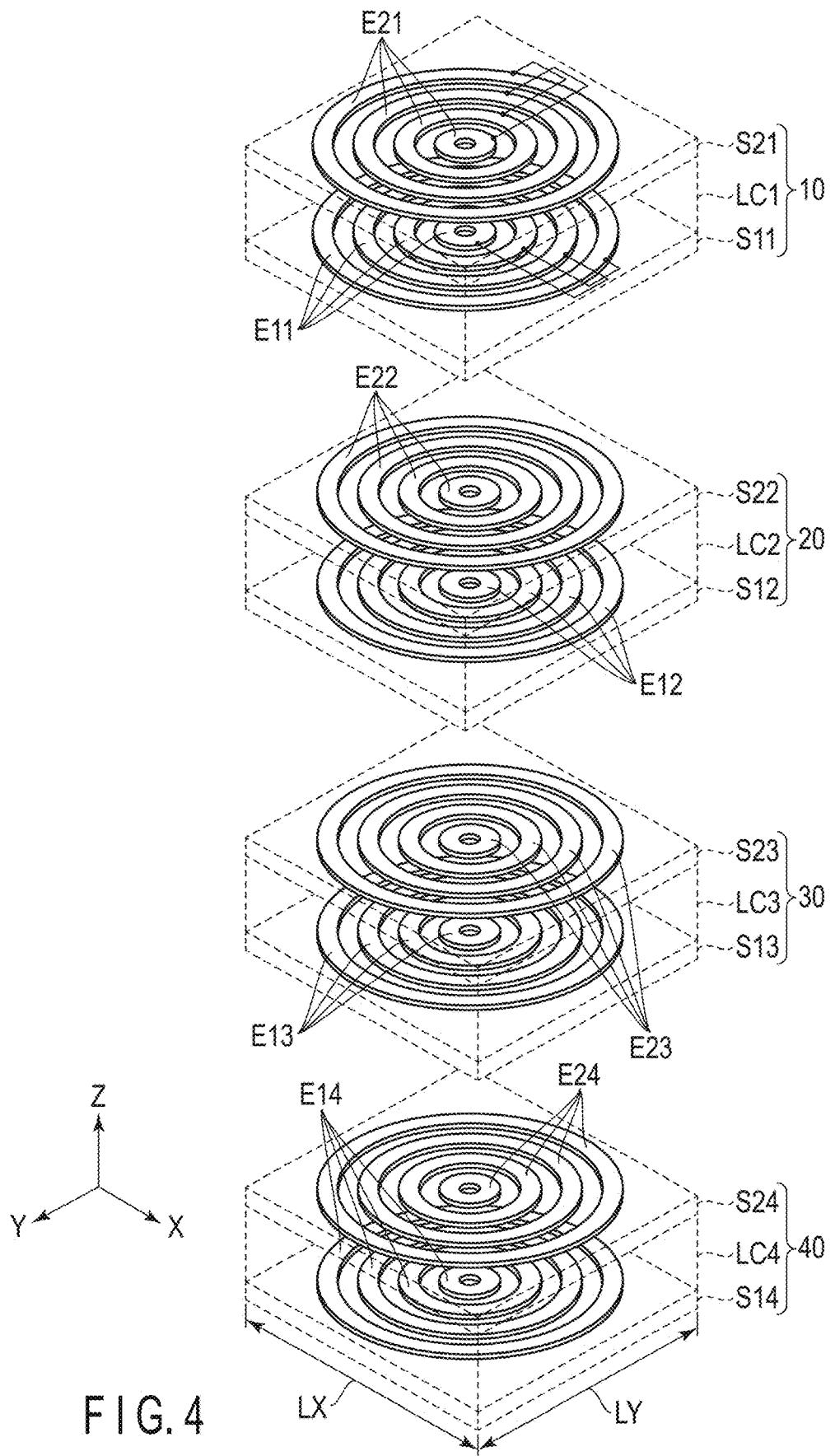
FIG. 4 is a perspective view illustrating the first liquid crystal cell 10, the second liquid crystal cell 20, the third liquid crystal cell 30, and the fourth liquid crystal cell 40 by way of another example.

FIG. 4 is a perspective view illustrating the first liquid crystal cell 10, the second liquid crystal cell 20, the third liquid crystal cell 30, and the fourth liquid crystal cell 40 by way of another example. The example illustrated in FIG. 4 is different from the example illustrated in FIG. 3 in that a plurality of first electrodes of each liquid crystal cell are formed in an annular shape and arranged concentrically, and a plurality of second electrodes are formed in an annular shape and disposed concentrically.

Figure 5:
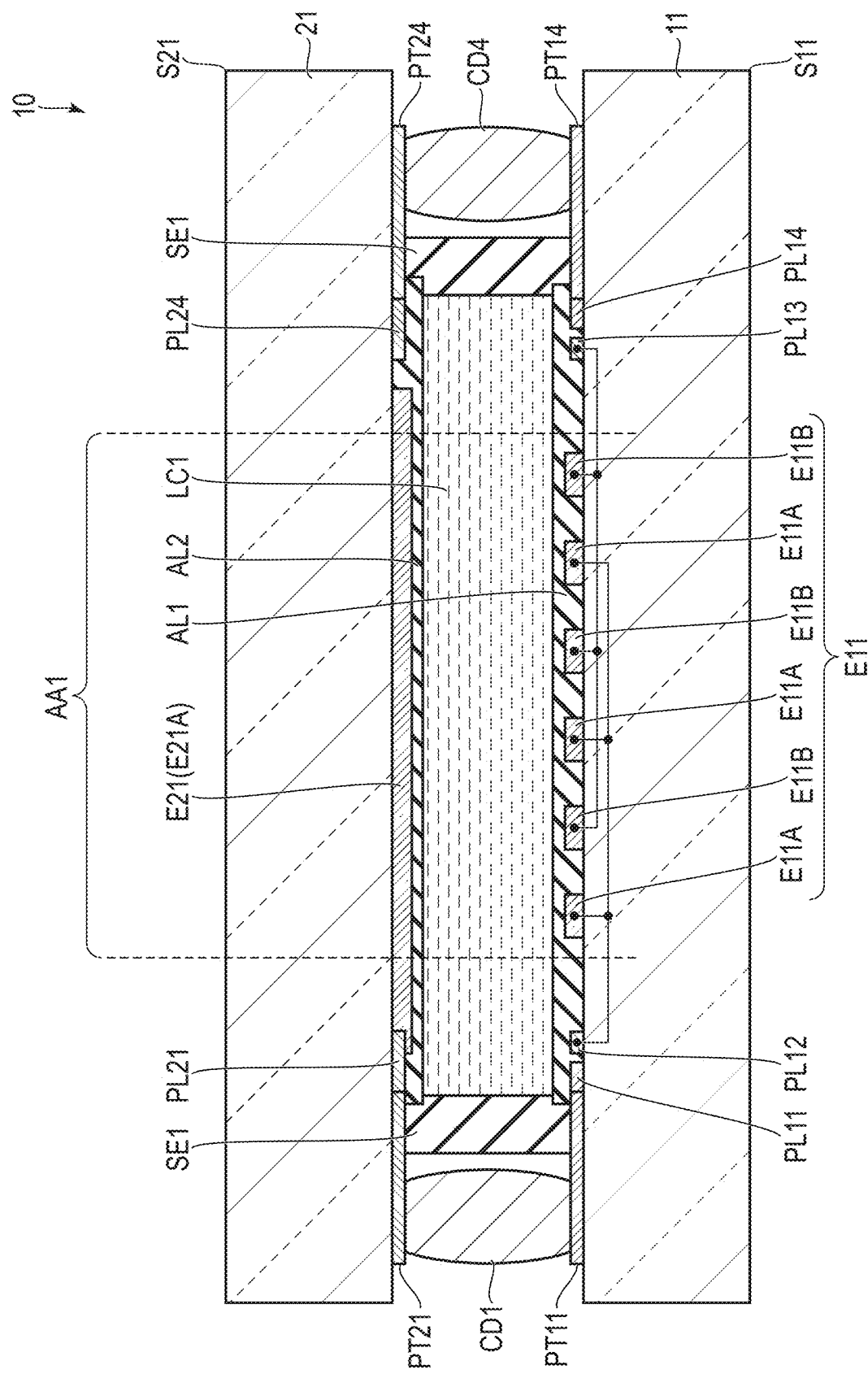
FIG. 5 is a cross-sectional view illustrating a configuration example of the first liquid crystal cell 10.

FIG. 5 is a cross-sectional view illustrating a configuration example of the first liquid crystal cell 10. Although the first liquid crystal cell 10 will be described here, the second liquid crystal cell 20, the third liquid crystal cell 30, and the fourth liquid crystal cell 40 also have the same cross-sectional structure as the first liquid crystal cell 10, and the description thereof will be omitted. Incidentally, the first spacer disposed inside the sealant SE1 and the second spacer disposed in the effective area AA1 are not illustrated and will be described in detail later.

The first substrate S11 includes an insulating substrate 11, a first electrode E11 including first strip electrodes E11A and second strip electrodes E11B, power supply lines PL11 to PL14, and an alignment film AL1. The first electrode E11 and the power supply lines PL11 to PL14 are disposed on the insulating substrate 11 and covered with the alignment film AL1. Incidentally, other thin films may be interposed between the first electrode E11 and the insulating substrate 11 and between the power supply lines PL11 to PL14 and the insulating substrate 11. The first strip electrode E11A is electrically connected to the power supply line PL12. The second strip electrode E11B is electrically connected to the power supply line PL13.

A power supply terminal PT11 electrically connected to the power supply line PL11 is drawn outward from the sealant SE1. A power supply terminal PT14 electrically connected to the power supply line PL14 is drawn outward from the sealant SE1. The power supply terminals PT11 and PT14 are exposed from the alignment film AL1.

The second substrate S21 includes an insulating substrate 21, a second electrode E21, power supply lines PL21 and PL24, and an alignment film AL2. The second electrode E21 and the power supply lines PL21 and PL24 are disposed on the insulating substrate 21 and covered with the alignment film AL2. Incidentally, although only one second electrode E21 is illustrated here, a plurality of the second electrodes E21 illustrated in FIG. 3 are interposed between the insulating substrate 21 and the alignment film AL2. Of a plurality of the second electrodes E21, the third strip electrode E21A is electrically connected to the power supply line PL21, and the fourth strip electrode E21B is electrically connected to the power supply line PL24. Incidentally, other thin films may be interposed between the second electrode E21 and the insulating substrate 21 and between the power supply lines PL21 and PL24 and the insulating substrate 21.

A power supply terminal PT21 electrically connected to the power supply line PL21 is drawn outward from the sealant SE1. The power supply terminal PT21 is located directly above the power supply terminal PT11. A power supply terminal PT24 electrically connected to the power supply line PL24 is drawn outward from the sealant SE1. The power supply terminal PT24 is located directly above the power supply terminal PT14. The power supply terminals PT21 and PT24 are exposed from the alignment film AL2.

A conductive material CD1 is interposed between the power supply terminal PT11 and the power supply terminal PT21, and electrically connects both the terminals. A conductive material CD4 is interposed between the power supply terminal PT14 and the power supply terminal PT24, and electrically connects both the terminals.

The insulating substrates 11 and 21 are, for example, transparent substrates such as glass substrates and resin substrates. The first electrode E11 and the second electrode E21 are transparent electrodes formed of a transparent conductive material such as indium tin oxide (ITO) or indium zinc oxide (IZO). The power supply lines PL11 to PL14 and the power supply lines PL21 and PL24 are formed of a metal material such as aluminum, titanium, molybdenum, or tungsten. Incidentally, the power supply lines PL11 to PL14 and the power supply lines PL21 and PL24 may be formed of the same material as the transparent electrode. The alignment films AL1 and AL2 are horizontal alignment films having an alignment restriction force approximately parallel to the X-Y plane.

Figure 6:
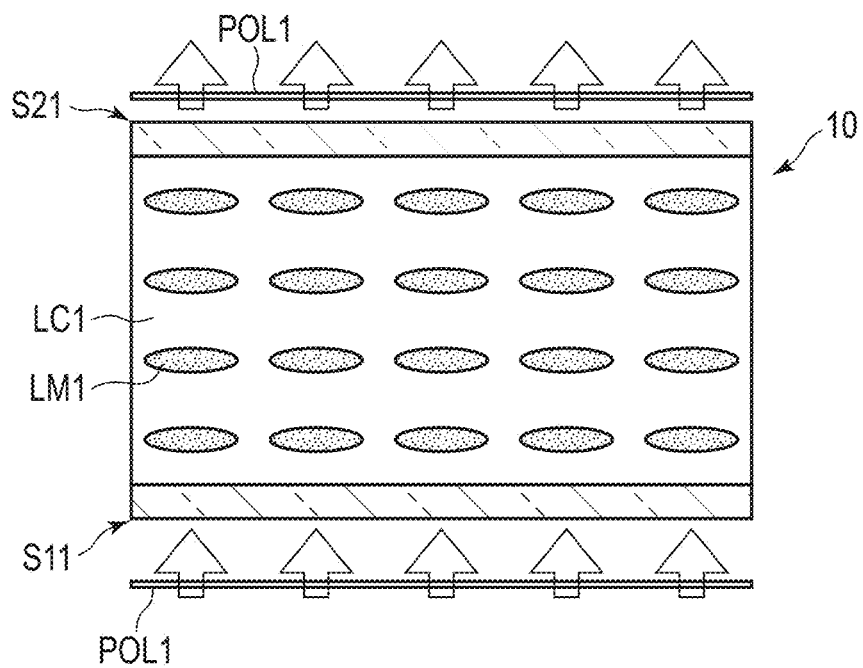
FIG. 6 is a view schematically illustrating the first liquid crystal cell 10 in an off state (OFF) in which an electric field is not formed in a liquid crystal layer LC1.
Figure 7:
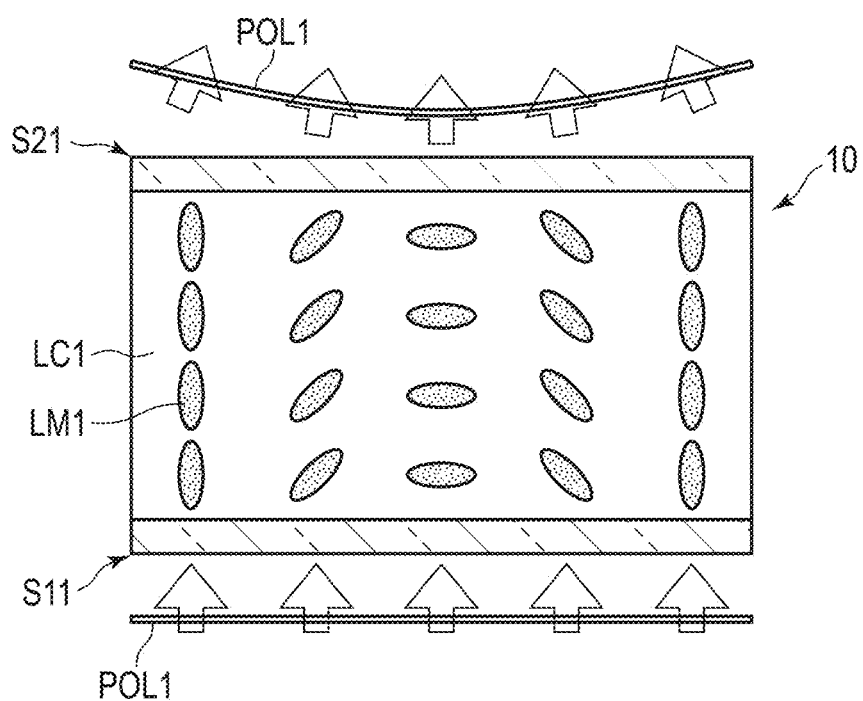
FIG. 7 is a view schematically illustrating the first liquid crystal cell 10 in an on state (ON) in which an electric field is formed in the liquid crystal layer LC1.

Next, an optical action in first liquid crystal cell 10 will be described with reference to FIGS. 6 and 7. In FIGS. 6 and 7, only configurations necessary for description are illustrated.

FIG. 6 is a view schematically illustrating the first liquid crystal cell 10 in an off state (OFF) in which an electric field is not formed in the liquid crystal layer LC1.

In the liquid crystal layer LC1 in the off state, liquid crystal molecules LM1 are initially aligned. The liquid crystal layer LC1 in the off state has a substantially uniform refractive index distribution. For this reason, the liquid crystal layer LC1 allows a first polarization component POL1 that is incident light on the first liquid crystal cell 10 to be transmitted through with little refraction (or divergence). Incidentally, the first polarization component POL1 here corresponds to, for example, P-polarized light among natural light. In the present specification, S-polarized light orthogonal to the P-polarized light may be referred to as a second polarization component POL2.

FIG. 7 is a view schematically illustrating the first liquid crystal cell 10 in an on state (ON) in which an electric field is formed in the liquid crystal layer LC1.

For example, when the liquid crystal layer LC1 has positive dielectric anisotropy, in the on state in which an electric field is formed in the liquid crystal layer LC1, the liquid crystal molecules LM1 are aligned such that the major axes thereof are along the electric field. For example, an electric field acting on a region of the liquid crystal layer LC1 in the vicinity of the first substrate S11 is formed by a potential difference between the first strip electrode E11A and the second strip electrode E11B illustrated in FIG. 5. When such an electric field acts on the liquid crystal layer LC1, a region in which the liquid crystal molecules LM1 rise substantially perpendicularly to the substrate, a region in which the liquid crystal molecules LM1 are maintained in the initially aligned state, a region in which the liquid crystal molecules LM1 rise obliquely to the substrate, and the like are formed in the liquid crystal layer LC1.

The liquid crystal molecules LM1 have refractive anisotropy $\Delta n$. For this reason, the liquid crystal layer LC1 in the on state has a refractive index distribution according to the aligned state of the liquid crystal molecules LM1, or a retardation distribution. The retardation herein is represented by Δn·d where d represents the thickness of the liquid crystal layer LC1 (or gap between the first substrate S11 and the second substrate S21).

In the on state, when being transmitted through the liquid crystal layer LC1, the first polarization component POL1 is diverged under the influence of the refractive index distribution of the liquid crystal layer LC1.

Similarly, when transmitted through the liquid crystal layer LC2 in the on state, the second polarization component POL2 is diverged under the influence of the refractive index distribution of the liquid crystal layer LC2.

As described above, according to the liquid crystal device 1 in which at least the first liquid crystal cell 10 capable of diverging the first polarization component POL1 and the second liquid crystal cell 20 capable of diverging the second polarization component POL2 are stacked, the emitted light from the light source module LS can be diverged.

Incidentally, when white light is incident on the liquid crystal layer on which the refractive index distribution is formed, the degree of divergence varies for each wavelength. For this reason, a part of the diverged white light may be colored.

Therefore, the present embodiment provides the liquid crystal device 1 in which the first liquid crystal cell 10, the second liquid crystal cell 20, the third liquid crystal cell 30, and the fourth liquid crystal cell 40 are stacked. In the liquid crystal device 1 having the above configuration, for example, the first liquid crystal cell 10 and the fourth liquid crystal cell 40 primarily diverge the first polarization component (P-polarized light) POL1 of the emitted light from the light source module LS, and the second liquid crystal cell 20 and the third liquid crystal cell 30 primarily diverge the second polarization component (S-polarized light) POL2 thereof.

However, the refractive index distribution formed in the liquid crystal layer LC1 of the first liquid crystal cell 10 and the refractive index distribution formed in the liquid crystal layer LC4 of the fourth liquid crystal cell 40 are configured to be different from each other. Thus, the degree of divergence of the first polarization component POL1 in the first liquid crystal cell 10 is different from the degree of divergence of the first polarization component POL1 in the fourth liquid crystal cell 40, and colorshift of the first polarization component POL1 is suppressed.

Similarly, the refractive index distribution formed in the liquid crystal layer LC2 of the second liquid crystal cell 20 and the refractive index distribution formed in the liquid crystal layer LC3 of the third liquid crystal cell 30 are configured to be different from each other. Thus, the degree of divergence of the second polarization component POL2 in the second liquid crystal cell 20 is different from the degree of divergence of the second polarization component POL2 in the third liquid crystal cell 30, and colorshift of the second polarization component POL2 is suppressed.

Incidentally, the degree of divergence of the polarization component in each of the liquid crystal cells depends on the magnitude of the refractive index distribution. In other words, as the thickness of the liquid crystal layer or the gap between the first substrate and the second substrate is larger, a larger divergence action can be realized. For example, it is desired to form a gap of 10 μm or more, further 15 μm or more, and in some cases, 50 μm or more. However, an attempt to simply form a gap of 10 μm or more results in an increase in the amount of sealing material used, and in addition, a risk of causing a problem that the height of the sealant is not uniform or the sealant is broken may be increased.

Therefore, in the present embodiment, a first spacer SP1 is disposed inside the sealant. Although first liquid crystal cell 10 among the liquid crystal cells constituting the liquid crystal device 1 will be described herein, the second liquid crystal cell 20, the third liquid crystal cell 30, and the fourth liquid crystal cell 40 are configured similarly to the first liquid crystal cell 10.

Figure 8:
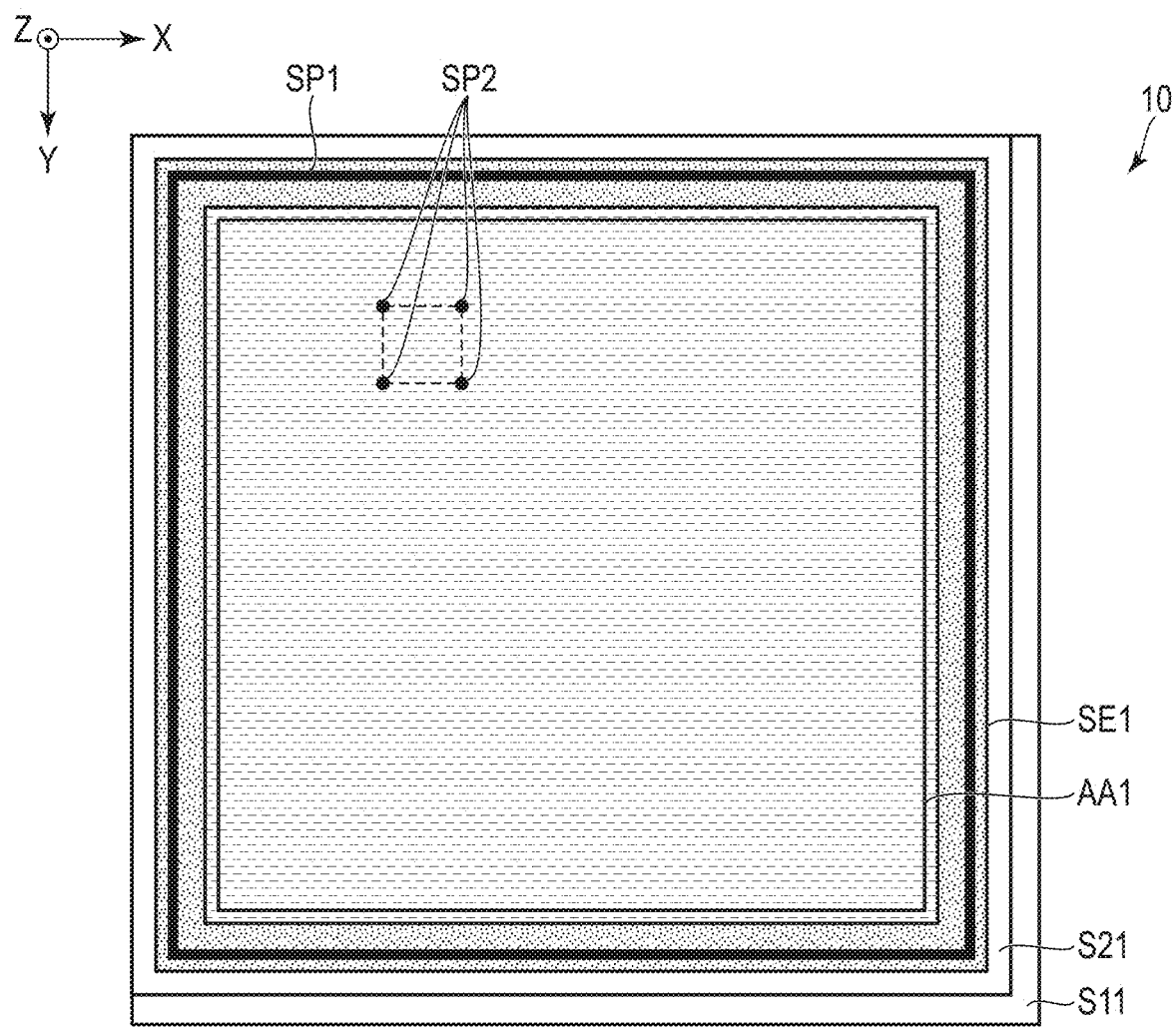
FIG. 8 is a plane view illustrating an example of the first liquid crystal cell 10.

FIG. 8 is a plane view illustrating an example of the first liquid crystal cell 10.

The sealant SE1 is formed in a continuous frame shape. The first spacer SP1 is disposed inside the sealant SE1 and holds a gap between the first substrate S11 and the second substrate S21. In the example illustrated in FIG. 8, the first spacer SP1 is formed in a line shape in each of the first direction X and the second direction Y, and is formed in a continuous frame shape similarly to the sealant SE1.

A plurality of second spacers SP2 are disposed in the effective area AA1 in the inside surrounded by the sealant SE1. In the example illustrated in FIG. 8, four second spacers SP2 are disposed so as to be located at the vertices of a quadrangle (rectangular shape, square shape, or rhombus shape). Similarly to the first spacer SP1, the second spacers SP2 also hold the gap between the first substrate S11 and the second substrate S21.

Figure 9:
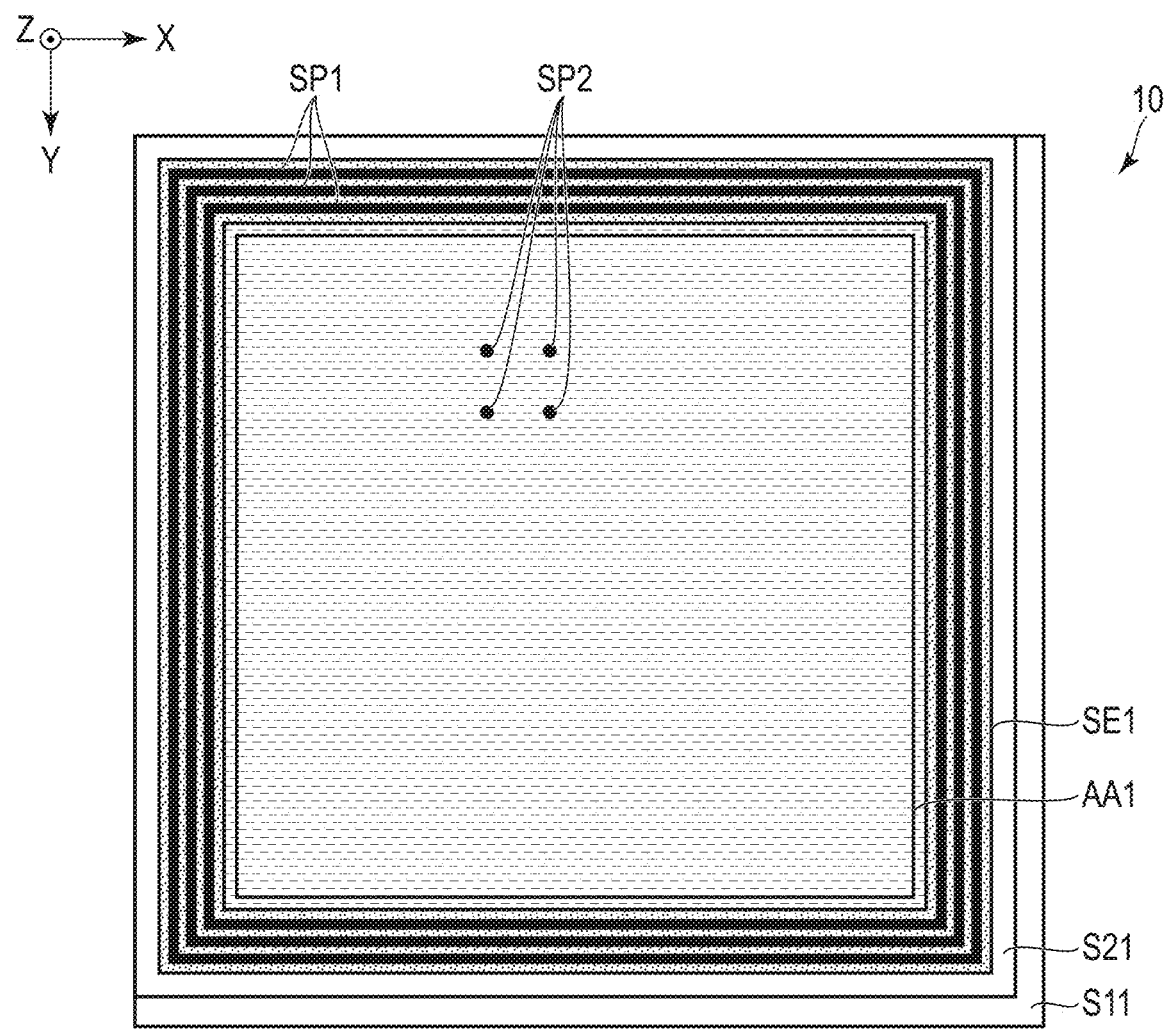
FIG. 9 is a plane view illustrating another example of the first liquid crystal cell 10.

FIG. 9 is a plane view illustrating another example of the first liquid crystal cell 10.

The example illustrated in FIG. 9 is different from the example illustrated in FIG. 8 in that the first spacers SP1 are formed in a plurality of lines. Here, the first spacers SP1 are formed in three lines spaced apart from each other, but the number of the first spacers SP1 is not limited to the illustrated example.

FIG. 10 is a plane view illustrating another example of the first liquid crystal cell 10.

The example illustrated in FIG. 10 is different from the example illustrated in FIG. 8 in that the first spacers SP1 are formed in a plurality of dot shapes.

Figure 11:
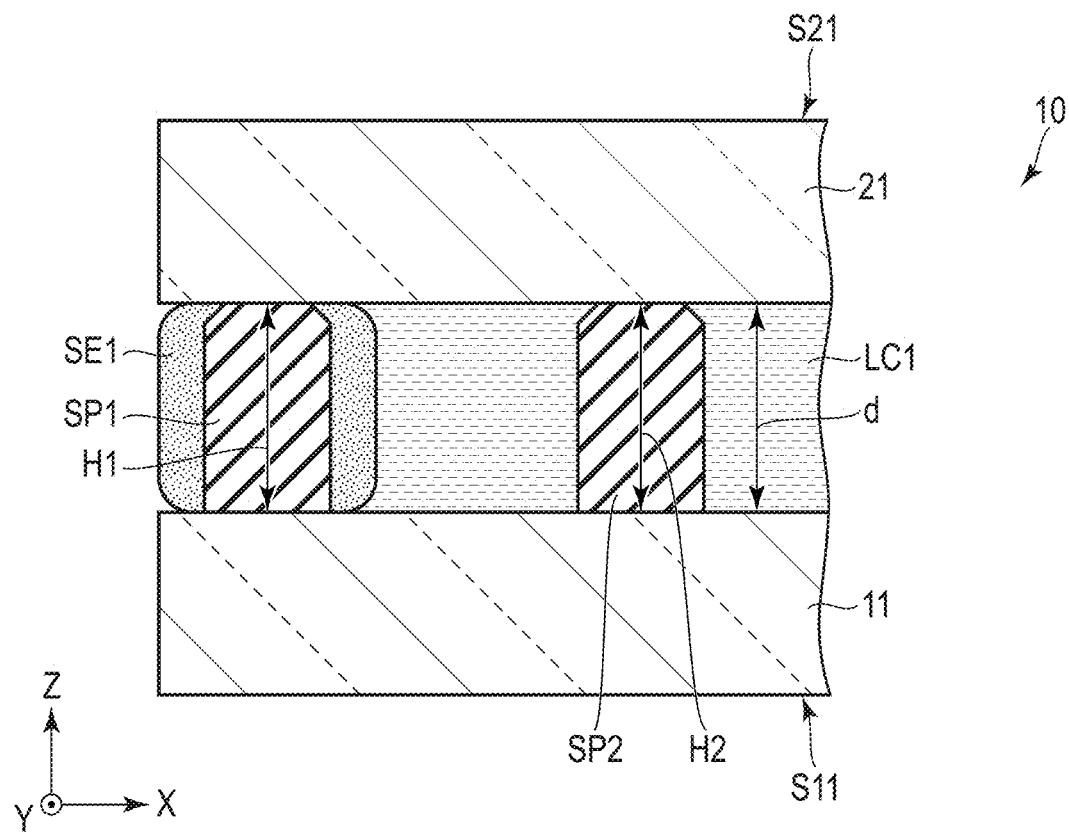
FIG. 11 is a schematic cross-sectional view of the first liquid crystal cell 10 including a first spacer SP1 and a second spacer SP2.

FIG. 11 is a schematic cross-sectional view of the first liquid crystal cell 10 including the first spacer SP1 and the second spacer SP2. Here, only configurations necessary for description are illustrated.

The first spacer SP1 is disposed inside the sealant SE1, and is surrounded around by the sealant SE1. In other words, the entire side surface of the first spacer SP1 is in contact with the sealant SE1. The second spacer SP2 is surrounded around by the liquid crystal layer LC1. For example, the side surface of the second spacer SP2 is in contact with the liquid crystal layer LC1, but a part of the side surface of the second spacer SP2 is covered with the alignment films AL1 and AL2 illustrated in FIG. 5.

In the example illustrated in FIG. 11, both the first spacer SP1 and the second spacer SP2 are disposed on the first substrate S11, but may be disposed on the second substrate S21. The first spacer SP1 and the second spacer SP2 are formed of the same material.

For example, a height H1 of the first spacer SP1 along the third direction Z is equal to a height H2 of the second spacer SP2 along the third direction Z. However, the heights H1 and H2 are not necessarily equal. Each of the first spacer SP1 and the second spacer SP2 has a function of holding a gap d of 10 μm or more, and each of the heights thereof is set in consideration of the thickness of the member overlapping with the first spacer SP1 and the thickness of the member overlapping with the second spacer SP2. In other words, the height of the first spacer SP1 may be equal to the height of the second spacer SP2, the height of the first spacer SP1 may be smaller than the height of the second spacer SP2, or the height of the first spacer SP1 may be larger than the height of the second spacer SP2. The spacers having different heights can be formed by, for example, a photolithographic process using a halftone mask or a gray tone mask.

As described above, in the configuration in which the liquid crystal layer LC1 is held in the gap d of 10 μm or more, since the first spacer SP1 is disposed inside the sealant SE1, an increase in the amount of sealing material used is suppressed. In addition, since the gap at the peripheral portion of the first liquid crystal cell 10 is held by the first spacer SP1, non-uniformity in the gap at the peripheral portion is suppressed as compared with the case of the sealant SE1 alone. Furthermore, since the first spacer SP1 is included inside the sealant SE1, the strength of the sealant SE1 is improved, sealant breakage is suppressed, and leakage of the liquid crystal material through the interface between the sealant SE1 and the first substrate S11 and the interface between the sealant SE1 and the second substrate S21 is further suppressed. Therefore, degradation in reliability can be suppressed.

Figure 12:
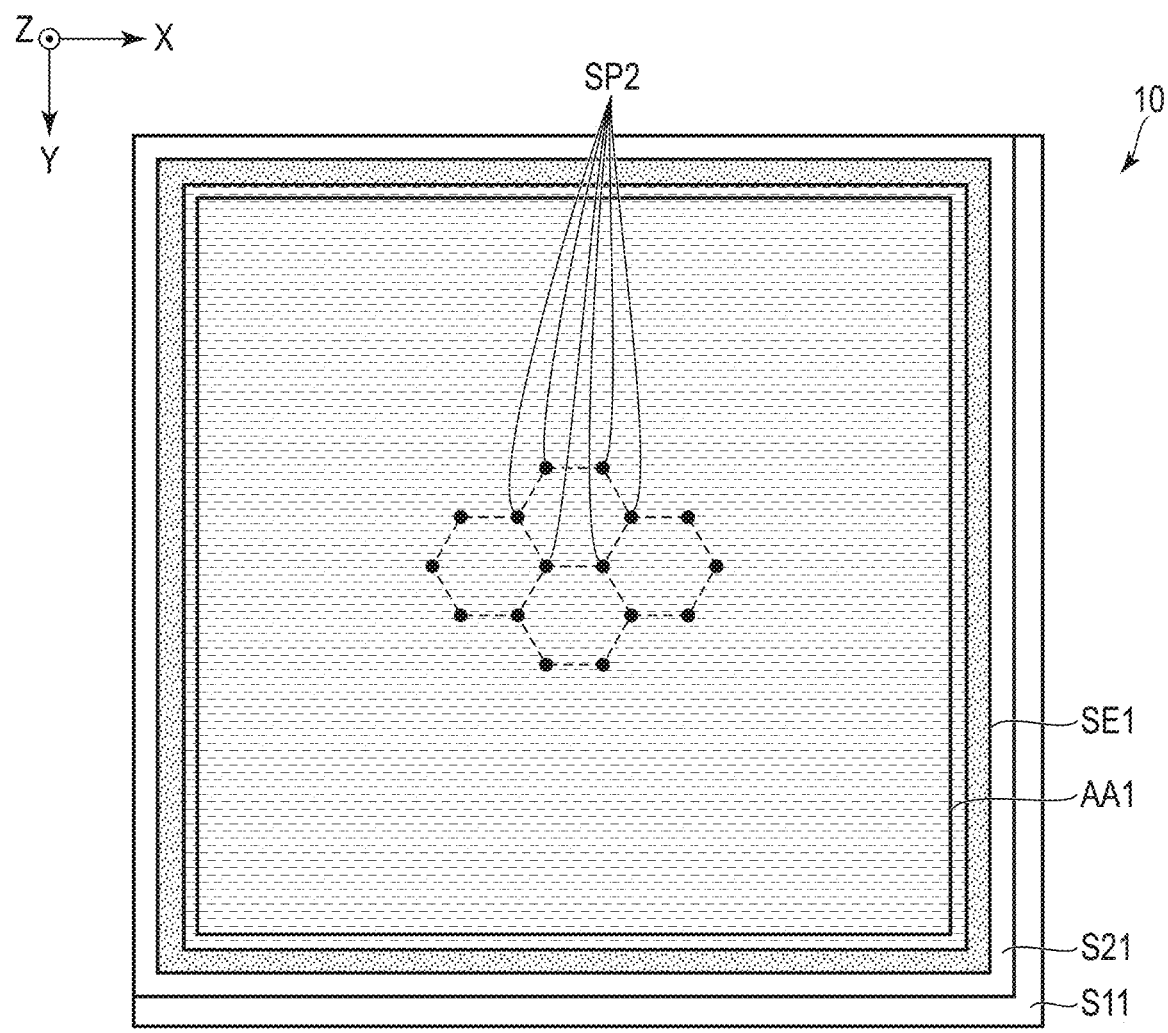
FIG. 12 is a plane view illustrating another example of the first liquid crystal cell 10.

FIG. 12 is a plane view illustrating another example of the first liquid crystal cell 10.

The example illustrated in FIG. 12 is different from the examples illustrated in FIGS. 8 to 10 in that six of the second spacers SP2 are disposed so as to be located at the vertices of a hexagon. The first spacer SP1 may be formed in a single line shape as illustrated in FIG. 8, in a plurality of line shapes as illustrated in FIG. 9, or in a plurality of dot shapes as illustrated in FIG. 10.

When the plurality of liquid crystal cells are stacked, in a case where the second spacers SP2 located in each of the effective areas overlap with each other, moire due to slight positional shift of the liquid crystal cells may be generated. In contrast, when the second spacers SP2 are individually laid out in each liquid crystal cell, the manufacturing yield may be decreased.

According to the example illustrated in FIG. 12, when the first liquid crystal cell 10 and the fourth liquid crystal cell 40 having the relationship of 90° rotational symmetry are stacked, the second spacers SP2 of the first liquid crystal cell 10 does not overlap with the second spacers SP2 of the fourth liquid crystal cell 40. Therefore, moire is suppressed. In addition, two liquid crystal cells having the same layout of the second spacers SP2 can be used as the first liquid crystal cell 10 and the fourth liquid crystal cell 40, and a decrease in manufacturing yield is suppressed.

Figure 13:
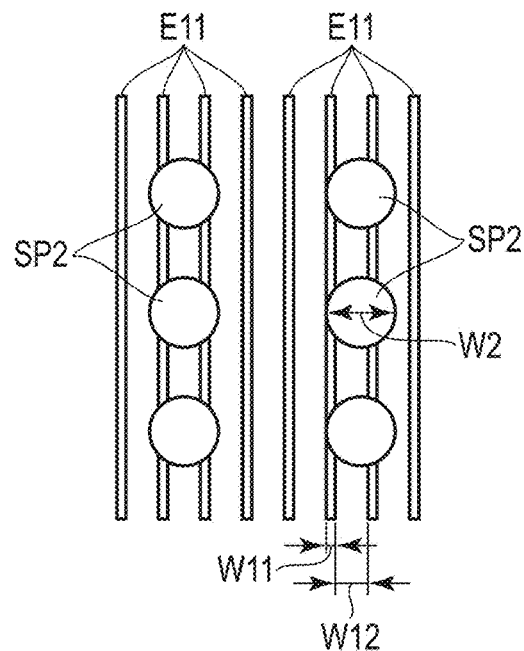
FIG. 13 is a plane view illustrating first electrodes E11 and second spacers SP2 of the first liquid crystal cell 10 by way of example.

FIG. 13 is a plane view illustrating the first electrodes E11 and the second spacers SP2 of the first liquid crystal cell 10 by way of example.

As illustrated in FIG. 3, each of the plurality of first electrodes E11 illustrated here extends linearly. The second spacers SP2 are disposed across a plurality of the first electrodes E11. Of the second spacer SP2 disposed on the first substrate S11, the bottom portion in contact with the first substrate S11 has a width W2 larger than the sum of a width W11 of the first electrode E11 and a width W12 of the gap between the first electrodes E11.

Figure 14:
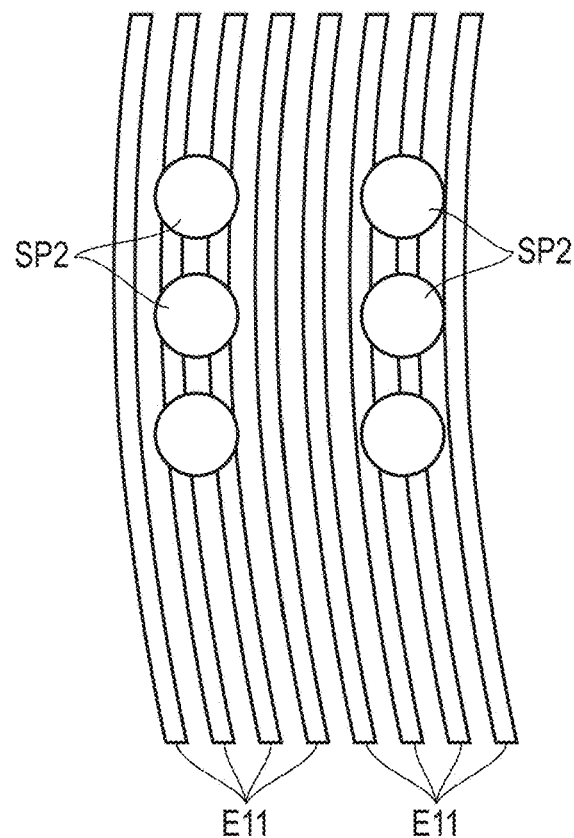
FIG. 14 is a plane view illustrating first electrodes E11 and second spacers SP2 of the first liquid crystal cell 10 by way of another example.

FIG. 14 is a plane view illustrating the first electrodes E11 and the second spacers SP2 of the first liquid crystal cell 10 by way of another example.

Each of the plurality of first electrodes E11 illustrated here extends in an arc shape as illustrated in FIG. 4. Also in this example, the second spacers SP2 are disposed across a plurality of the first electrodes E11.

Figure 15:
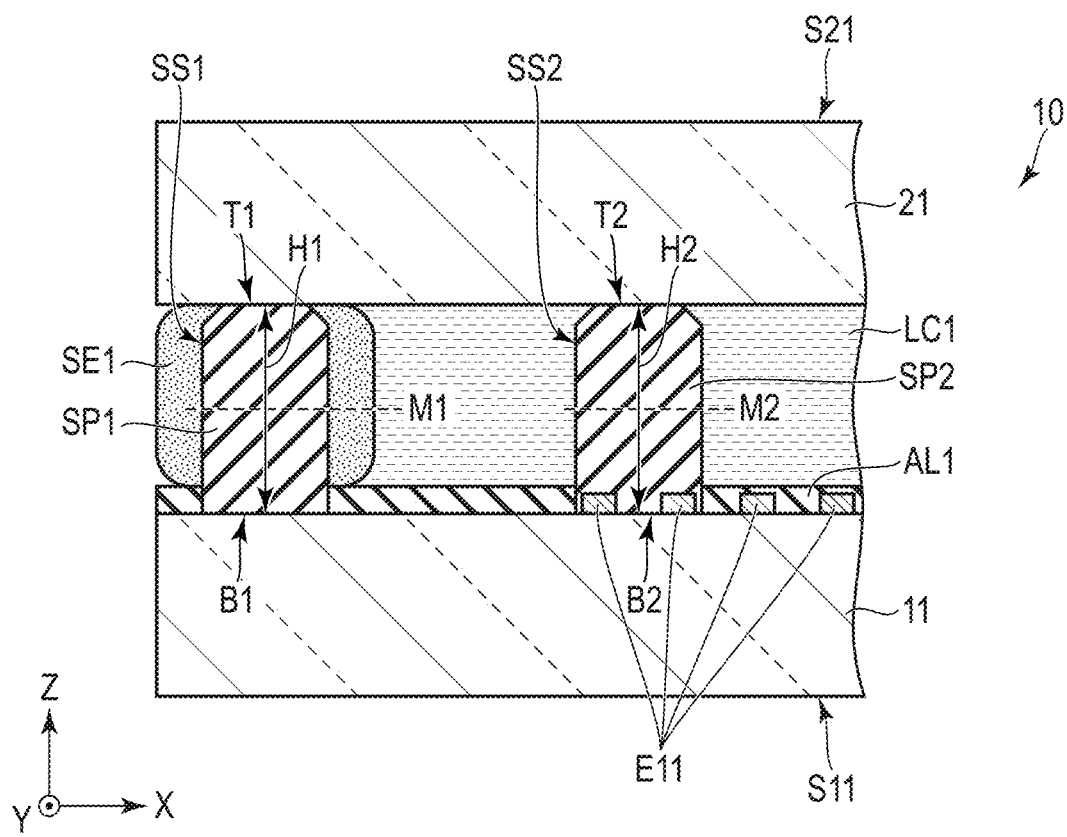
FIG. 15 is a schematic cross-sectional view of the first liquid crystal cell 10 including the first spacer SP1 and the second spacer SP2.

FIG. 15 is a schematic cross-sectional view of the first liquid crystal cell 10 including the first spacer SP1 and the second spacer SP2. Here, only configurations necessary for description are illustrated.

A bottom portion B2 of the second spacer SP2 is in contact with a plurality of the first electrodes E11 and is in contact with the insulating substrate 11 in the gap between the first electrodes E11. When another thin film is interposed between the insulating substrate 11 and the first electrode E11, the second spacer SP2 is in contact with the thin film in the gap between the first electrodes E11.

For example, when the adherence between the second spacer SP2 and the first electrode E11 is low and the adherence between the second spacer SP2 and the insulating substrate 11 is high, the second spacer SP2 in contact with only the first electrode E11 is easily peeled off as compared with the second spacer SP2 in contact with only the insulating substrate 11. Therefore, as described above, the second spacer SP2 comes into contact with a plurality of members made of different materials, so that peeling of the second spacer SP2 is suppressed.

The alignment film AL1 covering a plurality of the first electrodes E11 covers a side surface SS2 of the second spacer SP2 close to the bottom portion B2. When a position of a half of the height H2 of the second spacer SP2 is defined as an intermediate portion M2, the side surface SS2 above the intermediate portion M2 is exposed from the alignment film AL1. The total area of the side surface SS2 exposed from the alignment film AL1 (or the total area of the side surface SS2 in contact with the liquid crystal layer LC1) is larger than the total area of the side surface SS2 covered with the alignment film AL1.

A bottom portion B1 of the first spacer SP1 is in contact with the insulating substrate 11. However, similarly to the second spacer SP2, the first spacer SP1 may be in contact with a plurality of members made of different materials. For example, the first spacer SP1 may be in contact with not only the insulating substrate 11 but also a dummy electrode formed of the same material as the first electrode E11.

The alignment film AL1 covers a side surface SS1 of the first spacer SP1 close to the bottom portion B1. When a position of a half of the height H1 of the first spacer SP1 is defined as an intermediate portion M1, the side surface SS1 above the intermediate portion M1 is exposed from the alignment film AL1. The total area of the side surface SS1 exposed from the alignment film AL1 is larger than the total area of the side surface SS1 covered with the alignment film AL1.

The side surface SS1 exposed from the alignment film AL1 is in contact with the sealant SE1. In other words, the total area of the side surface SS1 covered with the sealant SE1 is larger than the total area of the side surface SS1 covered with the alignment film AL1.

An upper surface T1 of the first spacer SP1 and an upper surface T2 of the second spacer SP2 may be covered with the alignment film AL1, which is not illustrated.

Hereinafter, some variations of the first spacer SP1 and the second spacer SP2 will be described with reference to a cross-sectional view of an X-Z plane defined by the first direction X and the third direction Z. Viewing the X-Z plane is referred to as a cross-sectional view. In each cross-sectional view, only configurations necessary for description are illustrated. Further, a plurality of variations can be appropriately combined.

Figure 16:
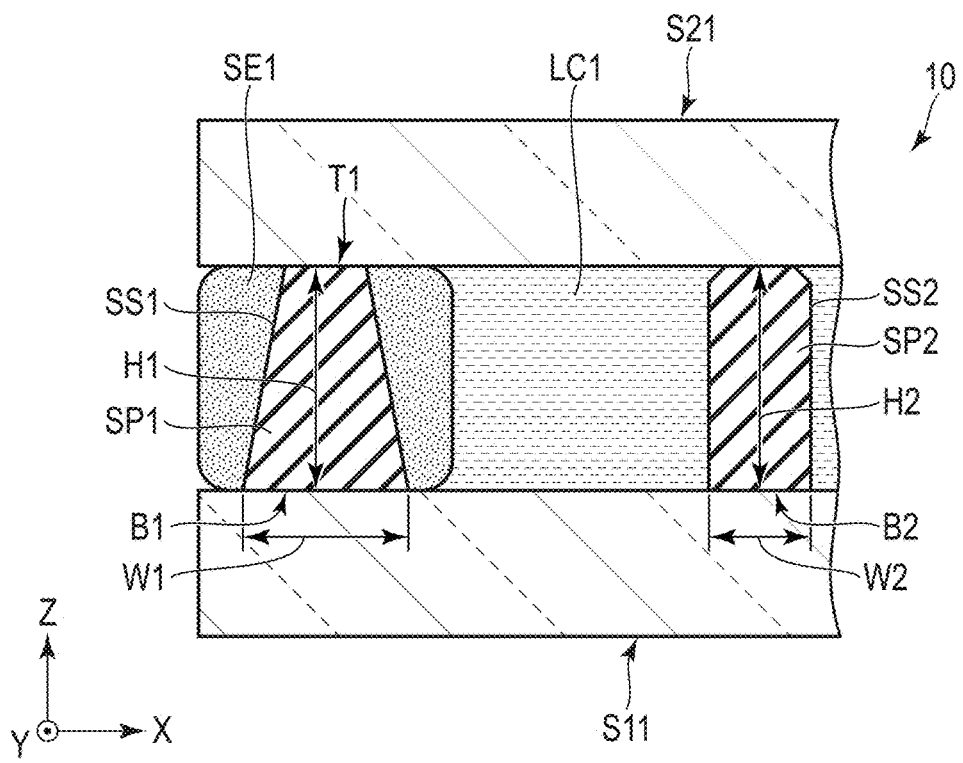
FIG. 16 is a cross-sectional view illustrating an example of the first liquid crystal cell 10 including the first spacer SP1 and the second spacer SP2.

FIG. 16 is a cross-sectional view illustrating an example of the first liquid crystal cell 10 including the first spacer SP1 and the second spacer SP2.

Regarding the first spacer SP1 and the second spacer SP2, attention is paid to an aspect ratio (H/W) when the width of the bottom portion is W and the height is H in the cross-sectional view.

The second spacer SP2 has an aspect ratio (H2/W2) of 0.5 or more. The first spacer SP1 has an aspect ratio (H1/W1) smaller than the aspect ratio (H2/W2) of the second spacer SP2.

For example, the width W2 is 50 μm, the height H2 is 30 μm, and the aspect ratio (H2/W2) is 0.6. In addition, the width W1 is 100 μm, the height H1 is 30 μm, and the aspect ratio (H1/W1) is 0.3.

Since the second spacer SP2 is required to reduce the occupying area in the effective area while maintaining the gap holding function, the width W2 (or a diameter of the bottom portion B2) is desirably small. When the width W2 is less than 30 μm, the aspect ratio (H2/W2) may be 1 or more. As the width W2 is smaller, the side surface SS2 tends to approach perpendicular to the first substrate S11.

The first spacer SP1 is required to increase a contact area with the sealant SE1 while maintaining the gap holding function. For this reason, as one method, in the example illustrated in FIG. 16, the width W1 of the bottom portion B1 is enlarged to 100 μm or more. The first spacer SP1 is formed in a forward tapered shape in which the width gradually decreases from the bottom portion B1 toward the upper surface T1. The side surface SS1 is angled with respect to the first substrate S11.

This example allows the respective requirements of the first spacer SP1 and the second spacer SP2 to be satisfied.

Figure 17:
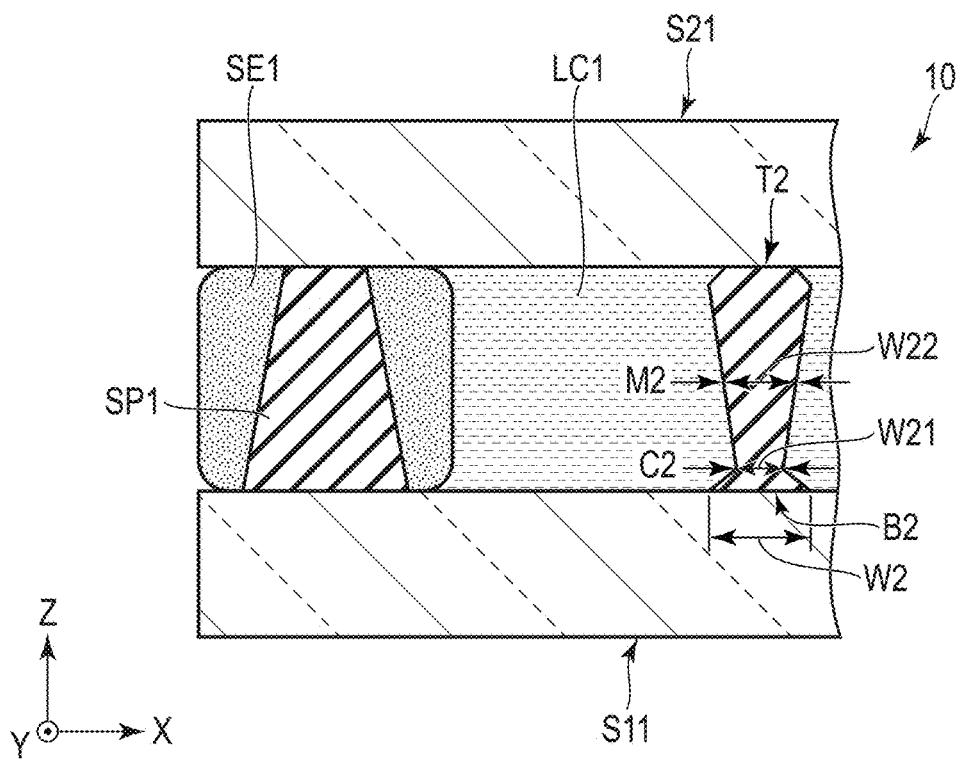
FIG. 17 is a cross-sectional view illustrating another example of the first liquid crystal cell 10 including the first spacer SP1 and the second spacer SP2.

FIG. 17 is a cross-sectional view illustrating another example of the first liquid crystal cell 10 including the first spacer SP1 and the second spacer SP2.

The second spacer SP2 has a constricted portion C2 between the bottom portion B2 and the intermediate portion M2. The constricted portion C2 has a width W21 smaller than each of the width W2 of the bottom portion B2 and a width W22 of the intermediate portion M2. In the example illustrated in FIG. 17, the second spacer SP2 is formed in an inverse tapered shape in which the width gradually decreases from the upper surface T2 toward the constricted portion C2, and formed in a forward tapered shape in which the width gradually decreases from the bottom portion B2 toward the constricted portion C2. For this reason, the width W22 is also smaller than the width W2. For example, W2 is about 10 μm.

Figure 18:
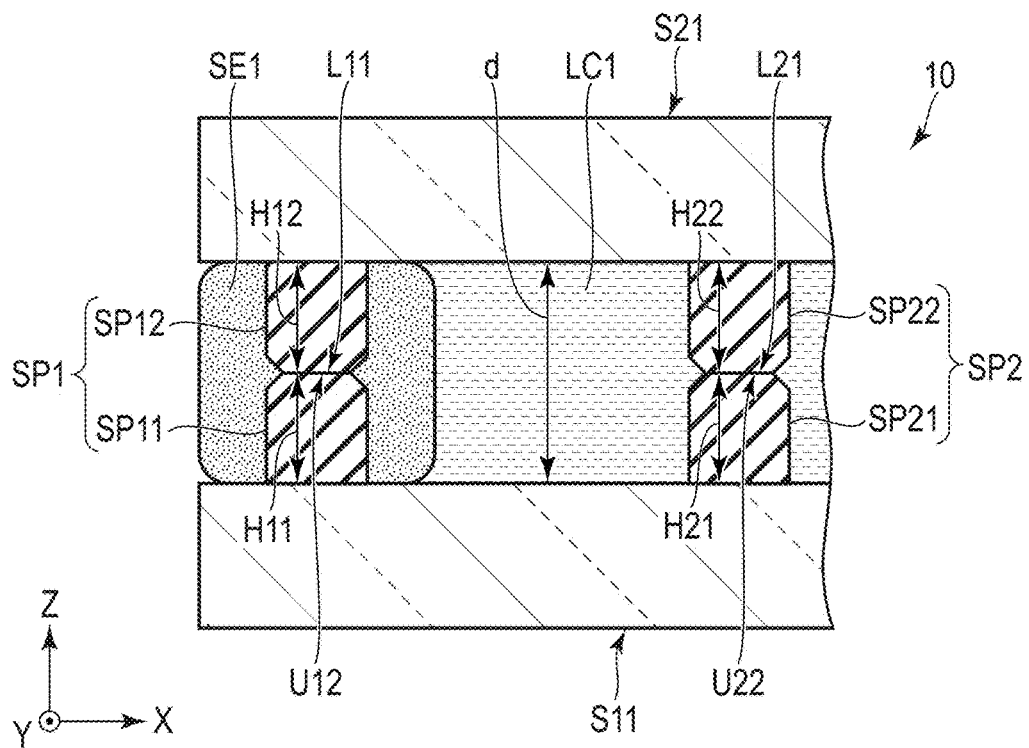
FIG. 18 is a cross-sectional view illustrating another example of the first liquid crystal cell 10 including the first spacer SP1 and the second spacer SP2.

FIG. 18 is a cross-sectional view illustrating another example of the first liquid crystal cell 10 including the first spacer SP1 and the second spacer SP2.

Here, it is assumed that the gap d is 50 μm or more.

The first spacer SP1 includes a first lower spacer SP11 disposed on the first substrate S11, and a first upper spacer SP12 located directly above the first lower spacer SP11 and disposed on the second substrate S21. The first lower spacer SP11 and the first upper spacer SP12 have opposing surfaces L11 and U12, respectively, that are opposed to each other. The opposing surfaces L11 and U12 are flat surfaces, for example. The opposing surfaces L11 and U12 may be in contact with each other, but may be out of contact with each other.

The second spacer SP2 includes a second lower spacer SP21 disposed on the first substrate S11 and a second upper spacer SP22 located directly above the second lower spacer SP21 and disposed on the second substrate S21. The second lower spacer SP21 and the second upper spacer SP22 have opposing surfaces L21 and U22, respectively, that are opposed to each other. The opposing surfaces L21 and U22 are flat surfaces, for example. The opposing surfaces L21 and U22 may be in contact with each other, but may be out of contact with each other.

The alignment films AL1 and AL2 may be interposed between the opposing surfaces L11 and U12 and between the opposing surfaces L21 and U22, respectively, or the sealant SE1 may be interposed therebetween.

A height H11 of the first lower spacer SP11 and a height H12 of the first upper spacer SP12 may be equal to or different from each other. The sum of the height H11 and the height H12 may correspond to the height H1 required by the first spacer SP1.

A height H21 of the second lower spacer SP21 and a height H22 of the second upper spacer SP22 may be equal to or different from each other. The sum of the height H21 and the height H22 may correspond to the height H2 required by the second spacer SP2.

For example, both the heights H11 and H12 and the heights H21 and H22 are 20 μm or more.

According to this example, when each of the first lower spacer SP11 and the first upper spacer SP12 is formed to have a height of 20 μm or more, a large gap d is formed, and a liquid crystal device having a higher degree of divergence can be provided.

Figure 19:
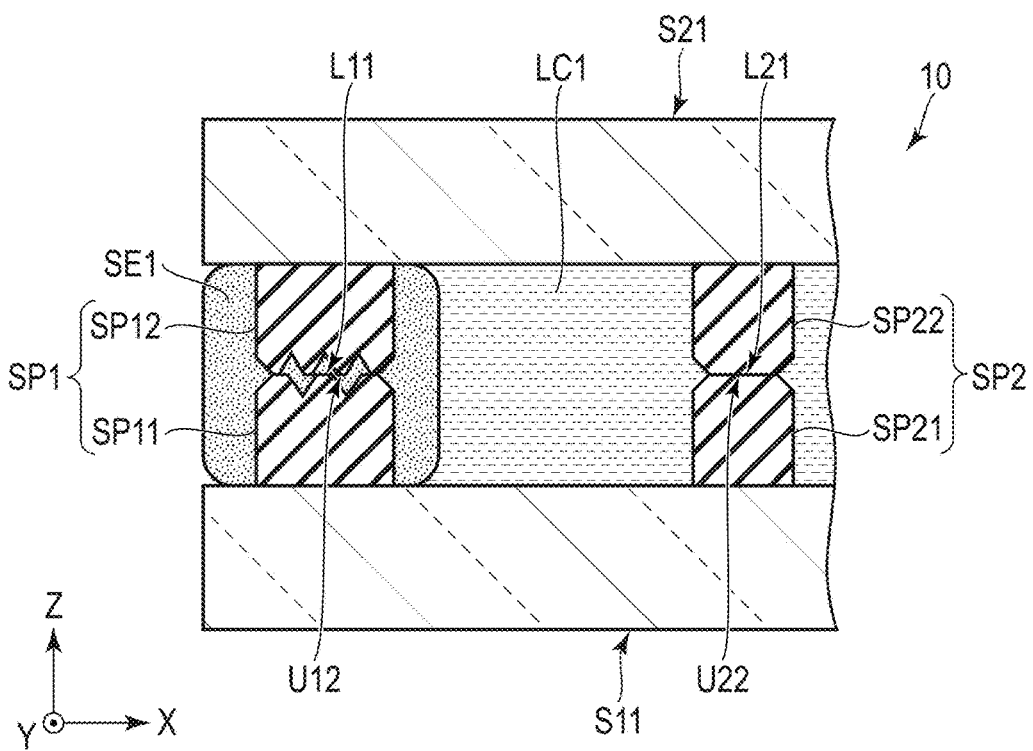
FIG. 19 is a cross-sectional view illustrating another example of the first liquid crystal cell 10 including the first spacer SP1 and the second spacer SP2.

FIG. 19 is a cross-sectional view illustrating another example of the first liquid crystal cell 10 including the first spacer SP1 and the second spacer SP2.

The opposing surface L11 of the first lower spacer SP11 and the opposing surface U12 of the first upper spacer SP12 are uneven surfaces. The sealant SE1 is interposed between the opposing surface L11 and the opposing surface U12. In other words, as compared with the example illustrated in FIG. 18, a contact area between the first lower spacer SP11 and the sealant SE1 and a contact area between the first upper spacer SP12 and the sealant SE1 can be increased.

Incidentally, in the second spacer SP2, both the opposing surfaces L21 and U22 are flat surfaces.

Figure 20:
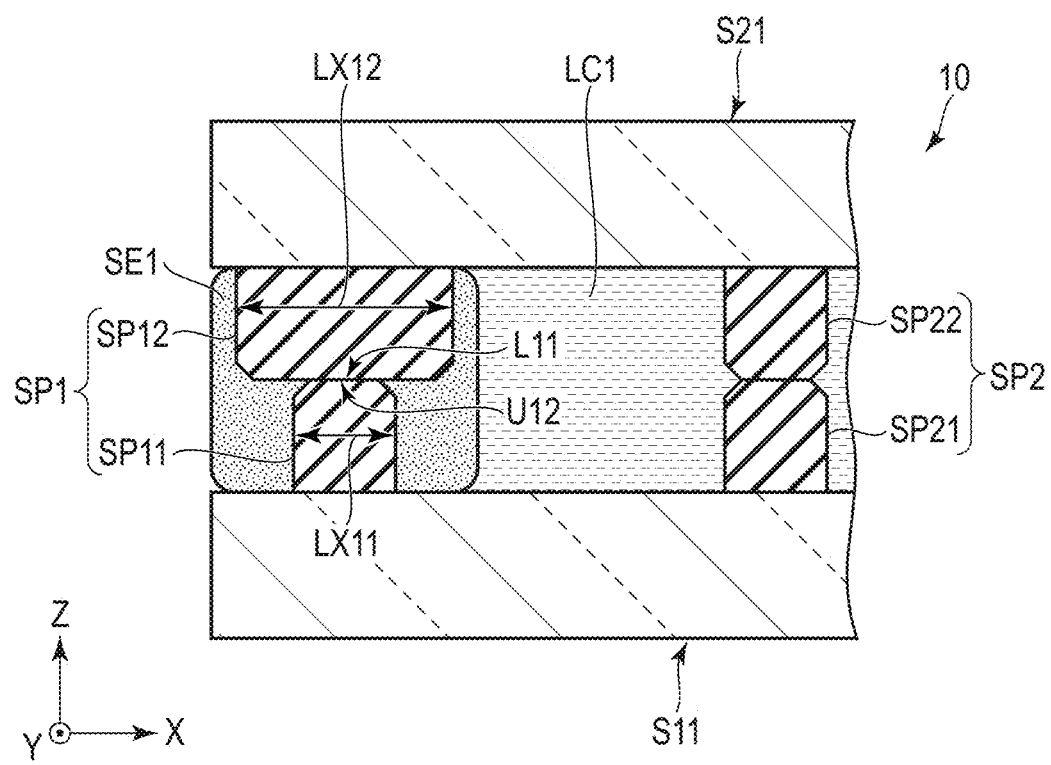
FIG. 20 is a cross-sectional view illustrating another example of the first liquid crystal cell 10 including the first spacer SP1 and the second spacer SP2.

FIG. 20 is a cross-sectional view illustrating another example of the first liquid crystal cell 10 including the first spacer SP1 and the second spacer SP2.

Regarding a length in the first direction X crossing the sealant SE1, the first lower spacer SP11 has a length LX11 smaller than a length LX12 of the first upper spacer SP12. Incidentally, the length LX11 of the first lower spacer SP11 may be larger than the length LX12 of the first upper spacer SP12. Both the opposing surfaces L11 and U12 are flat surfaces, but may be uneven surfaces.

Figure 21A:
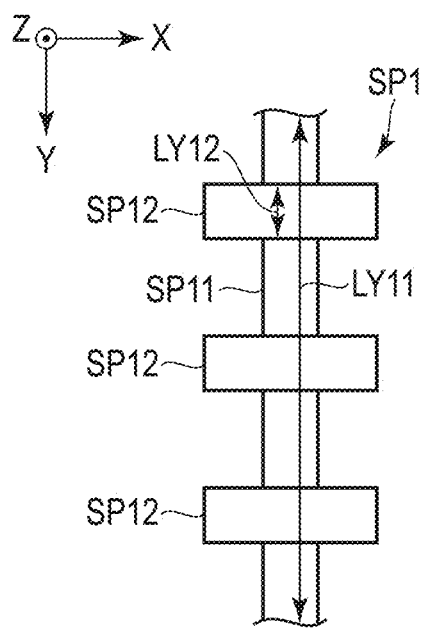
FIG. 21A is a plane view of the first spacer SP1 illustrated in FIG. 20.
Figure 21B:
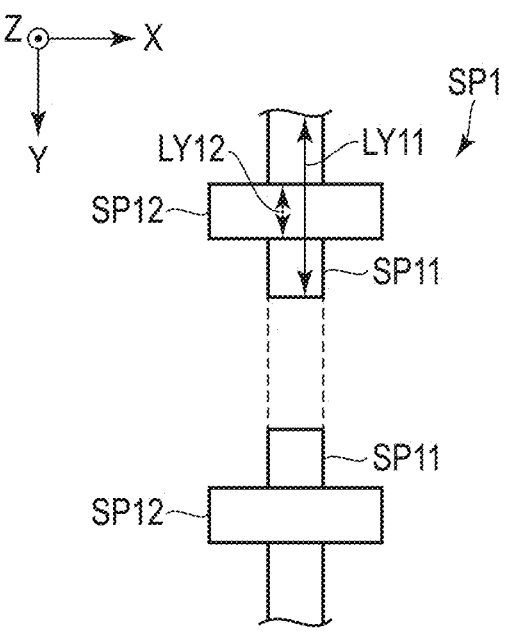
FIG. 21B is a plane view of the first spacer SP1 illustrated in FIG. 20.

FIGS. 21A and 21B are plane views of the first spacer SP1 illustrated in FIG. 20.

In the example illustrated in FIG. 21A, the first lower spacer SP11 is formed in a line shape along the second direction Y. A plurality of the first upper spacers SP12 are arranged spaced apart along the second direction Y and each intersect the first lower spacer SP11. Regarding the length in the second direction Y, the first lower spacer SP11 has a length LY11 larger than a length LY12 of the first upper spacer SP12.

In the example illustrated in FIG. 21B, the first spacer SP1 is formed in a dot shape. A plurality of the first lower spacers SP11 and a plurality of the first upper spacers SP12 are arranged spaced apart along the second direction Y. Each of the first lower spacers SP11 intersects each of the first upper spacers SP12. Regarding the length in the second direction Y, the first lower spacer SP11 has a length LY11 larger than a length LY12 of the first upper spacer SP12.

Also in the example illustrated in FIGS. 20, 21A, and 21B, the contact area between the first lower spacer SP11 and the sealant SE1 and the contact area between the first upper spacer SP12 and the sealant SE1 can be increased.

Figure 22:
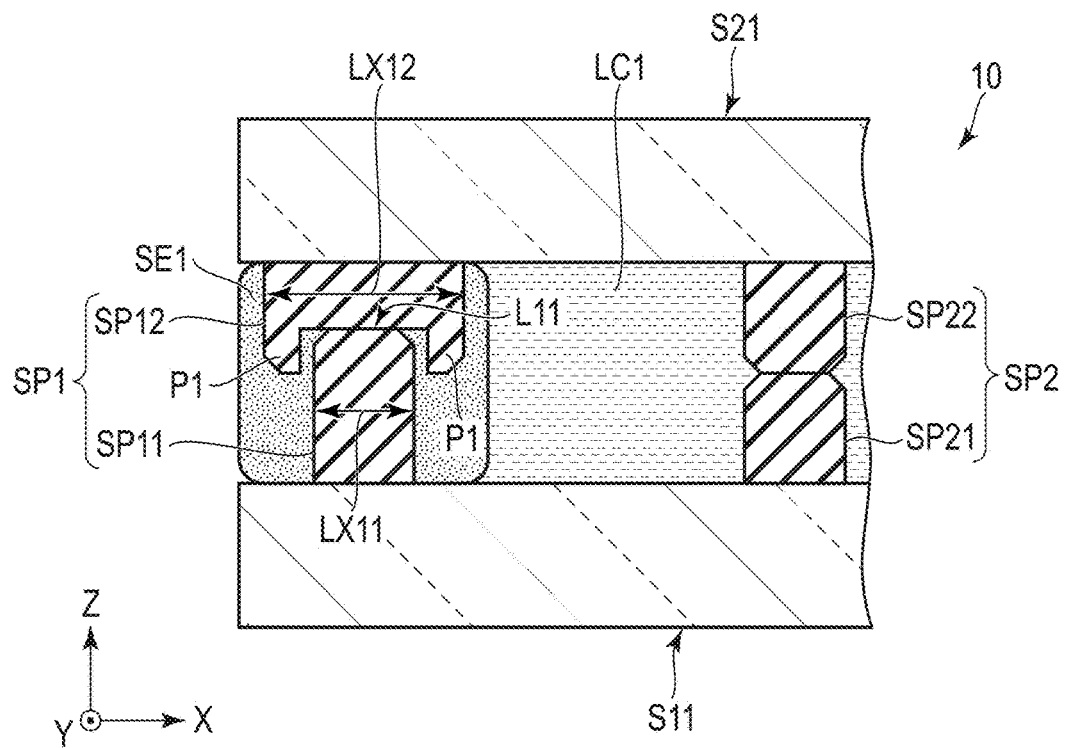
FIG. 22 is a cross-sectional view illustrating another example of the first liquid crystal cell 10 including the first spacer SP1 and the second spacer SP2.

FIG. 22 is a cross-sectional view illustrating another example of the first liquid crystal cell 10 including the first spacer SP1 and the second spacer SP2.

Regarding the length in the first direction X, the length LX11 of the first lower spacer SP11 is smaller than the length LX12 of the first upper spacer SP12. The first upper spacer SP12 has protrusions P1 at both end portions along the first direction X. The opposing surface L11 of the first lower spacer SP11 is located between a pair of protrusions P1. In other words, the upper end portion of the first lower spacer SP11 is located between the pair of protrusions P1.

Incidentally, the shape of the first lower spacer SP11 may be the line shape illustrated in FIG. 21A or the dot shape illustrated in FIG. 21B.

Also in this example, the same effects as those described above can be obtained.

Figure 23:
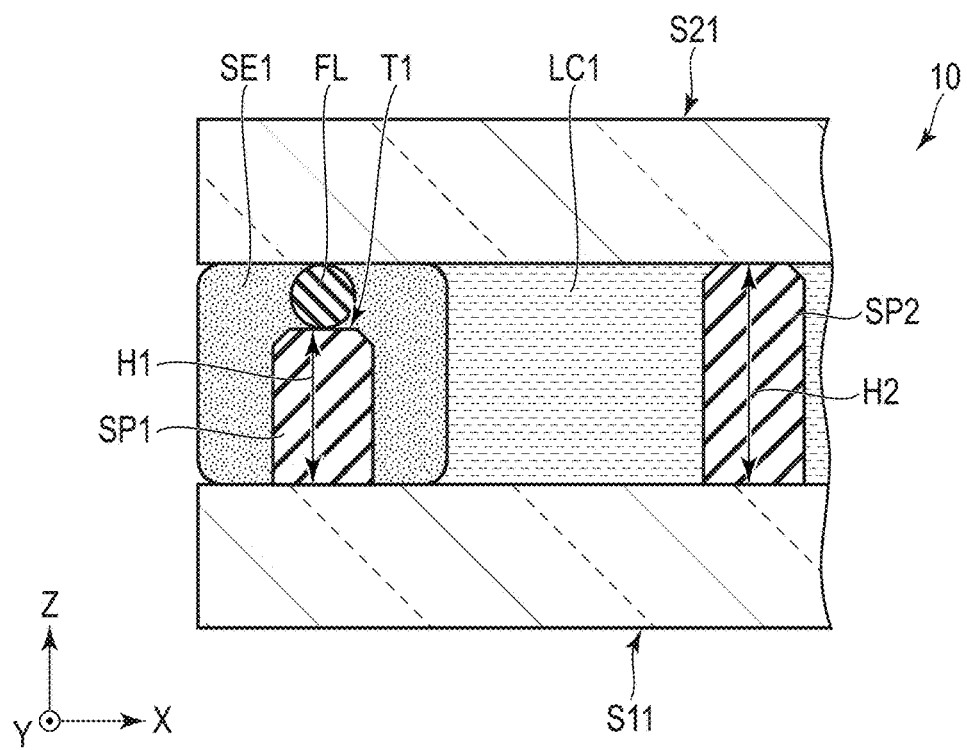
FIG. 23 is a cross-sectional view illustrating another example of the first liquid crystal cell 10 including the first spacer SP1 and the second spacer SP2.

FIG. 23 is a cross-sectional view illustrating another example of the first liquid crystal cell 10 including the first spacer SP1 and the second spacer SP2.

The height H1 of the first spacer SP1 is smaller than the height H2 of the second spacer SP2. The sealant SE1 is interposed between the first spacer SP1 and the second substrate S21. In the example illustrated in FIG. 23, the sealant SE1 includes a filler FL such as beads or fibers, and the filler FL is interposed between the upper surface T1 of the first spacer SP1 and the second substrate S21. In other words, when the sealant SE1 includes the filler FL, the height H1 is set assuming that the filler FL is caught between the first spacer SP1 and the second substrate S21. For this reason, non-uniformity in the gap can be suppressed.

Figure 24:
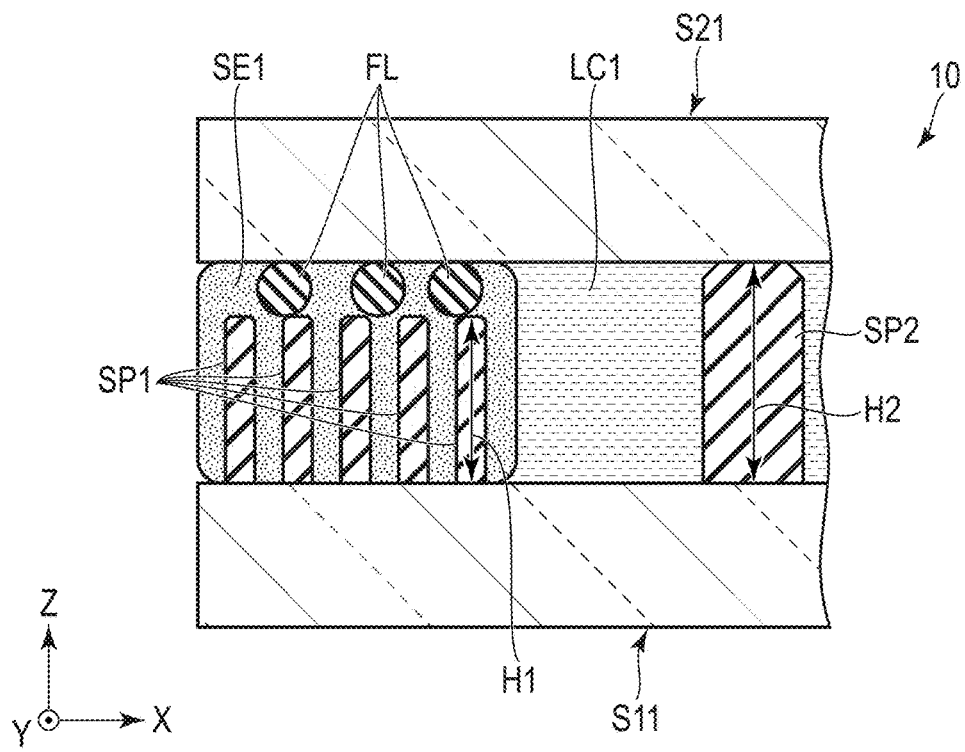
FIG. 24 is a cross-sectional view illustrating another example of the first liquid crystal cell 10 including the first spacer SP1 and the second spacer SP2.

FIG. 24 is a cross-sectional view illustrating another example of the first liquid crystal cell 10 including the first spacer SP1 and the second spacer SP2.

The example illustrated in FIG. 24 is different from the example illustrated in FIG. 23 in that the first spacer SP1 is formed in a plurality of line shapes or a plurality of dot shapes. The fillers FL are interposed between the first spacer SP1 and the second substrate S21. The sealant SE1 is also filled between the adjacent first spacers SP1.

According to the example illustrated in FIG. 24, the same effect as the example illustrated in FIG. 23 can be obtained. In addition, the contact area between the first spacer SP1 and the sealant SE1 can be increased. Furthermore, by increasing the volume of the first spacer SP1 included in the sealant SE1, the amount of sealing material used can be suppressed.

Figure 25:
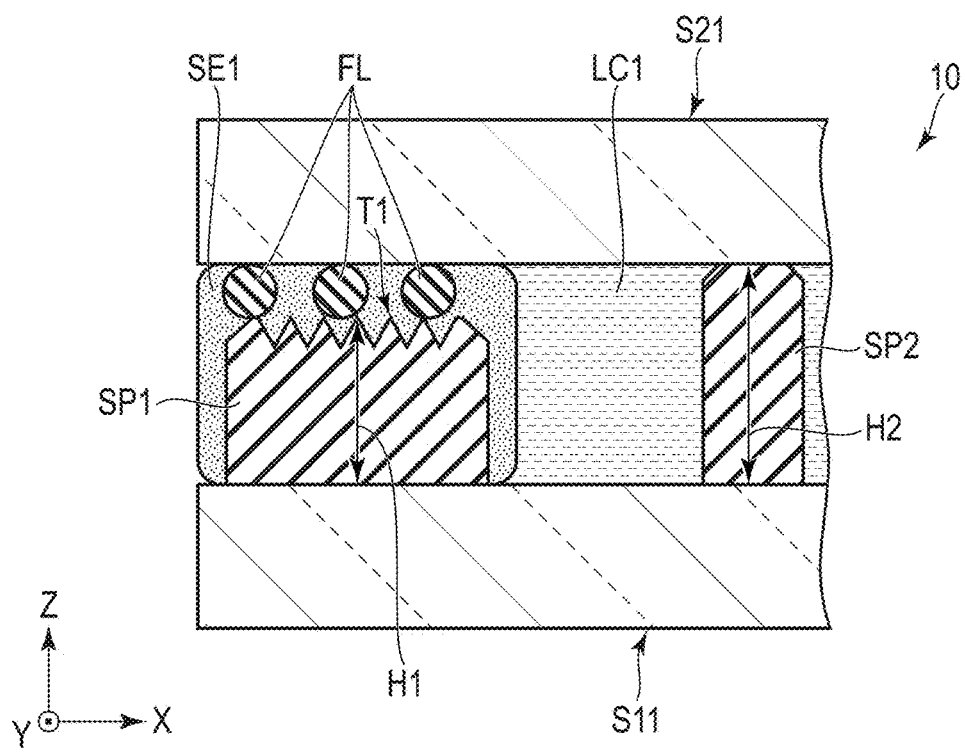
FIG. 25 is a cross-sectional view illustrating another example of the first liquid crystal cell 10 including the first spacer SP1 and the second spacer SP2.

FIG. 25 is a cross-sectional view illustrating another example of the first liquid crystal cell 10 including the first spacer SP1 and the second spacer SP2.

The example illustrated in FIG. 25 is different from the example illustrated in FIG. 23 in that the upper surface T1 of the first spacer SP1 is an uneven surface. The fillers FL are interposed between the first spacer SP1 and the second substrate S21.

Also in this example illustrated in FIG. 25, the same effects as those described above can be obtained.

Figure 26:
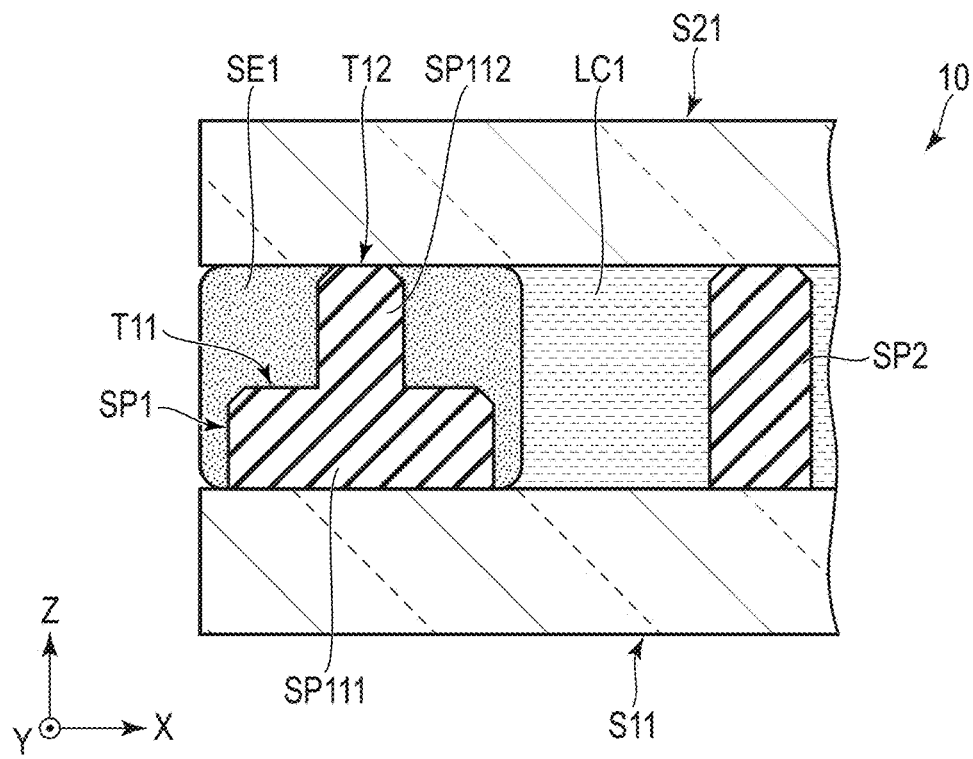
FIG. 26 is a cross-sectional view illustrating another example of the first liquid crystal cell 10 including the first spacer SP1 and the second spacer SP2.

FIG. 26 is a cross-sectional view illustrating another example of the first liquid crystal cell 10 including the first spacer SP1 and the second spacer SP2.

The first spacer SP1 includes a first part SP111 on a side close to the first substrate S11 and a second part SP112 on a side close to the second substrate S21. The first part SP111 has a first upper surface T11. The second part SP112 is formed integrally with the first part SP111 and has a second upper surface T12 between the first upper surface T11 and the second substrate S21. That is, the second part SP112 corresponds to a portion protruding from the first upper surface T11 of the first part SP111 toward the second substrate S21. Both the first upper surface T11 and the second upper surface T12 are flat surfaces substantially parallel to the X-Y plane.

The thickness of the sealant SE1 overlapping with the first upper surface T11 is larger than the thickness of the sealant SE1 overlapping with the second upper surface T12. The sealant SE1 may hardly overlap with the second upper surface T12.

Incidentally, the first spacer SP1 may have three or more upper surfaces having different heights along the third direction Z.

Also in the example illustrated in FIG. 26, the same effects as those described above can be obtained.

Figure 27:
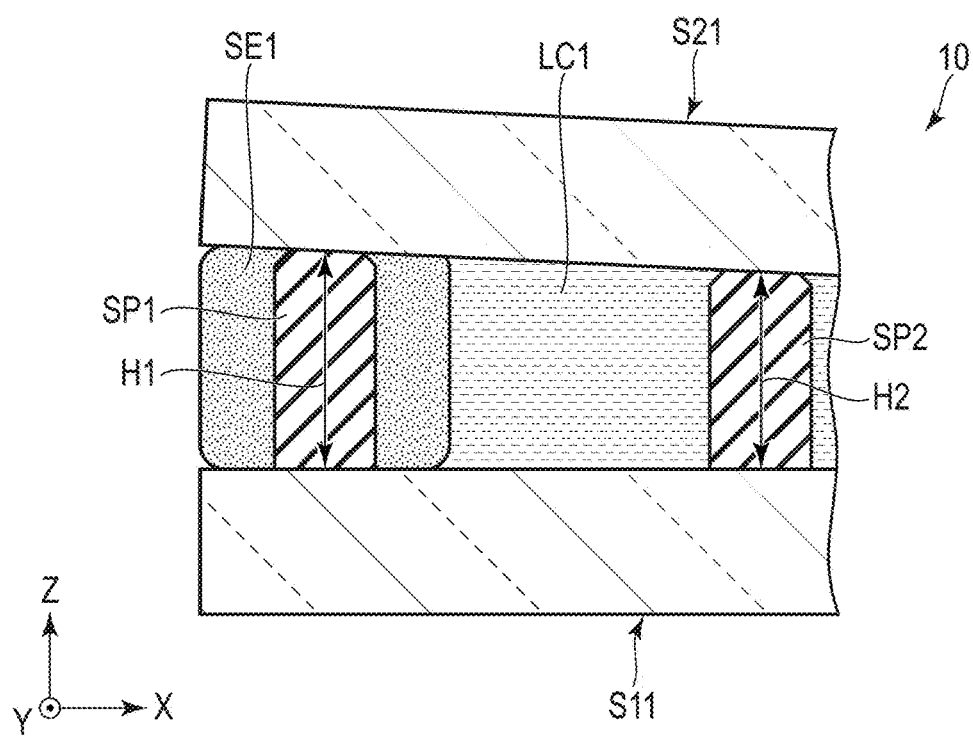
FIG. 27 is a cross-sectional view illustrating another example of the first liquid crystal cell 10 including the first spacer SP1 and the second spacer SP2.

FIG. 27 is a cross-sectional view illustrating another example of the first liquid crystal cell 10 including the first spacer SP1 and the second spacer SP2.

The height H1 of the first spacer SP1 is larger than the height H2 of the second spacer SP2. Although not illustrated in detail, when the thickness of the member interposed between the first spacer SP1 and the second substrate S21 is smaller than the thickness of the member interposed between the second spacer SP2 and the second substrate S21, the height H1 is set larger than the height H2, so that non-uniformity in the gap can be suppressed. Alternatively, the peripheral portions of the first substrate S11 and the second substrate S21 may be pressurized when the sealant SE1 is cured, and the height H1 may be set larger than the height H2 from the point of view of suppressing non-uniformity in the gap after the sealant SE1 is cured.

According to the present embodiment described above, it is possible to provide a liquid crystal device capable of suppressing degradation in reliability.

Based on the liquid crystal device which has been described in the above-described embodiments, a person having ordinary skill in the art may achieve liquid crystal devices with an arbitral design change; however, as long as they fall within the scope and spirit of the present invention, such liquid crystal devices are encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:
1. A liquid crystal device comprising:
  a first liquid crystal cell; and
  a second liquid crystal cell bonded to the first liquid crystal cell, wherein
  each of the first liquid crystal cell and the second liquid crystal cell comprises:
  a first substrate comprising a plurality of first electrodes formed in a strip shape;

a second substrate comprising a plurality of second electrodes formed in a strip shape;

a liquid crystal layer held in a gap of 10 μm or more between the first substrate and the second substrate;

a sealant bonding the first substrate and the second substrate together;

one or more first spacers disposed inside the sealant and holding the gap; and a plurality of second spacers disposed in an effective area surrounded by the sealant and holding the gap, the first spacer comprises a first lower spacer disposed on the first substrate and a first upper spacer located directly above the first lower spacer and disposed on the second substrate, each of the second spacer comprises a second lower spacer disposed on the first substrate, and a second upper spacer located directly above the second lower spacer and disposed on the second substrate, a plurality of the first electrodes comprise a plurality of first strip electrodes configured to have the same voltage applied thereto, and a plurality of second strip electrodes configured to have a voltage different from the voltage applied to the first strip electrodes applied thereto, the first strip electrodes and the second strip electrodes are alternately arranged, a plurality of the second electrodes comprise a plurality of third strip electrodes configured to have the same voltage applied thereto, and a plurality of fourth strip electrodes configured to have a voltage different from the voltage applied to the third strip electrodes applied thereto, and the third strip electrodes and the fourth strip electrodes are alternately arranged.

2. The liquid crystal device according to claim 1, wherein the first spacer is formed in a line shape.

3. The liquid crystal device according to claim 1, wherein a plurality of the first spacers are formed in a dot shape.

4. The liquid crystal device according to claim 1, wherein six of the second spacers each are disposed at vertices of a hexagon.

5. The liquid crystal device according to claim 1, wherein one of the second spacers is disposed across a plurality of the first electrodes.

6. The liquid crystal device according to claim 1, wherein
the second spacer has a constricted portion between the bottom portion and an intermediate portion at a position of a half of a height of the second spacer in a cross-sectional view, and
the constricted portion has a width smaller than any of a width of the bottom portion and a width of the intermediate portion.

7. The liquid crystal device according to claim 6, wherein
the first substrate further comprises an alignment film covering a plurality of the first electrodes,
the alignment film covers a side surface of the second spacer on the bottom portion side, and
the side surface above the intermediate portion is exposed from the alignment film.

8. The liquid crystal device according to claim 1, wherein
the first lower spacer and the first upper spacer have opposing surfaces, respectively, that are opposed to each other, and
each of the opposing surfaces is an uneven surface.

9. The liquid crystal device according to claim 1, wherein
regarding a length in a first direction crossing the sealant, the first lower spacer has a length smaller than a length of the first upper spacer, and
regarding a length in a second direction orthogonal to the first direction, the first lower spacer has a length larger than a length of the first upper spacer.

10. The liquid crystal device according to claim 9, wherein
the first upper spacer has protrusions at both end portions along the first direction, and
the first lower spacer is located between the protrusions.

11. The liquid crystal device according to claim 1, wherein
the first spacer is disposed on the first substrate,
a height of the first spacer is smaller than a height of the second spacer, and
the sealant is interposed between the first spacer and the second substrate.

12. The liquid crystal device according to claim 1, wherein
the first spacer comprises:
a first part having a first upper surface; and
a second part formed integrally with the first part and having a second upper surface between the first upper surface and the second substrate.

* * * * *